United States Patent [19]

Wolff et al.

[11] Patent Number: 5,767,987

[45] Date of Patent: Jun. 16, 1998

[54] METHOD AND APPARATUS FOR COMBINING MULTIPLE IMAGE SCANS FOR ENHANCED RESOLUTION

[75] Inventors: Gregory J. Wolff, Mountain View; Régis J. Van Steenkiste, Menlo Park, both of Calif.

[73] Assignees: Ricoh Corporation, Menlo Park, Calif.; Ricoh Company, Ltd., Tokyo, Japan

[21] Appl. No.: 312,141

[22] Filed: Sep. 26, 1994

[51] Int. Cl.$^6$ .............................. H04N 1/46; H04N 1/40; H04N 7/01

[52] U.S. Cl. .......................... 358/447; 358/448; 358/455; 358/458; 358/459; 358/534; 382/299; 348/448

[58] Field of Search ....................... 358/447, 448, 358/455, 456, 458, 459, 534; 382/299; 348/584, 448, 449, 452; 345/132

[56] References Cited

U.S. PATENT DOCUMENTS

| | | | |
|---|---|---|---|
| 4,720,745 | 1/1988 | DeForest et al. | 348/448 |
| 4,797,942 | 1/1989 | Burt | 382/284 |
| 5,115,312 | 5/1992 | Shim | 348/448 |
| 5,239,625 | 8/1993 | Bogart et al. | 382/284 |
| 5,325,449 | 6/1994 | Burt et al. | 382/284 |

OTHER PUBLICATIONS

Michal Irani et al., "Improving Resolution by Image Registration," Graphical Models and Image Processing, vol. 53, No. 3, pp. 231–239 (May 1991).

Danny Keren et al., "Image Sequence Enhancement Using Sub-pixel Displacements," IEEE Computer Society Conference on Computer Vision and Pattern Recognition, pp. 742–46 (1988).

Shmuel Peleg et al., "Improving Image Resolution Using Subpixel Motion," Pattern Recognition Letters 5 (1987), pp. 223–226 (Mar. 1987).

Peter Cheeseman et al., "Super–Resolved Surface Reconstruction from Multiple Images," Tech. Report FIA–93–02, Research Inst. for Advanced Computer Science, pp. 0–12 Jan. 29, 1993).

Donald G. Fink et al., Electronics Engineers' Handbook, McGraw–Hill Book Company, pp. 20–86 through 20–107.

K.S. Fu et al., Digital Pattern Recognition, Springer–Verlag, pp. 52–53 (1976).

Primary Examiner—Edward L. Coles, Sr.
Assistant Examiner—Kimberly A. Williams
Attorney, Agent, or Firm—Blakely, Sokoloff, Taylor & Zafman

[57] ABSTRACT

An apparatus and method for producing an enhanced resolution image from a set of lower resolution pixel image scans uses jitter and cogging errors introduced by the scanner to provide the additional information about the image that is required to produce the high resolution. One of the image scans is selected as a prototype image and is interpolated to produce an image of higher density samples (mixels). Each of the remaining pixel image scans is aligned with the interpolated prototype. The mixel values of the prototype are iteratively adjusted by minimizing an error metric representing the difference between pixel values computed from the prototype and the corresponding pixel values of each of the lower resolution pixel image scans. The method and apparatus are suitable for use in document copying system, high resolution television imaging, facsimile system, and character regeneration systems.

39 Claims, 13 Drawing Sheets

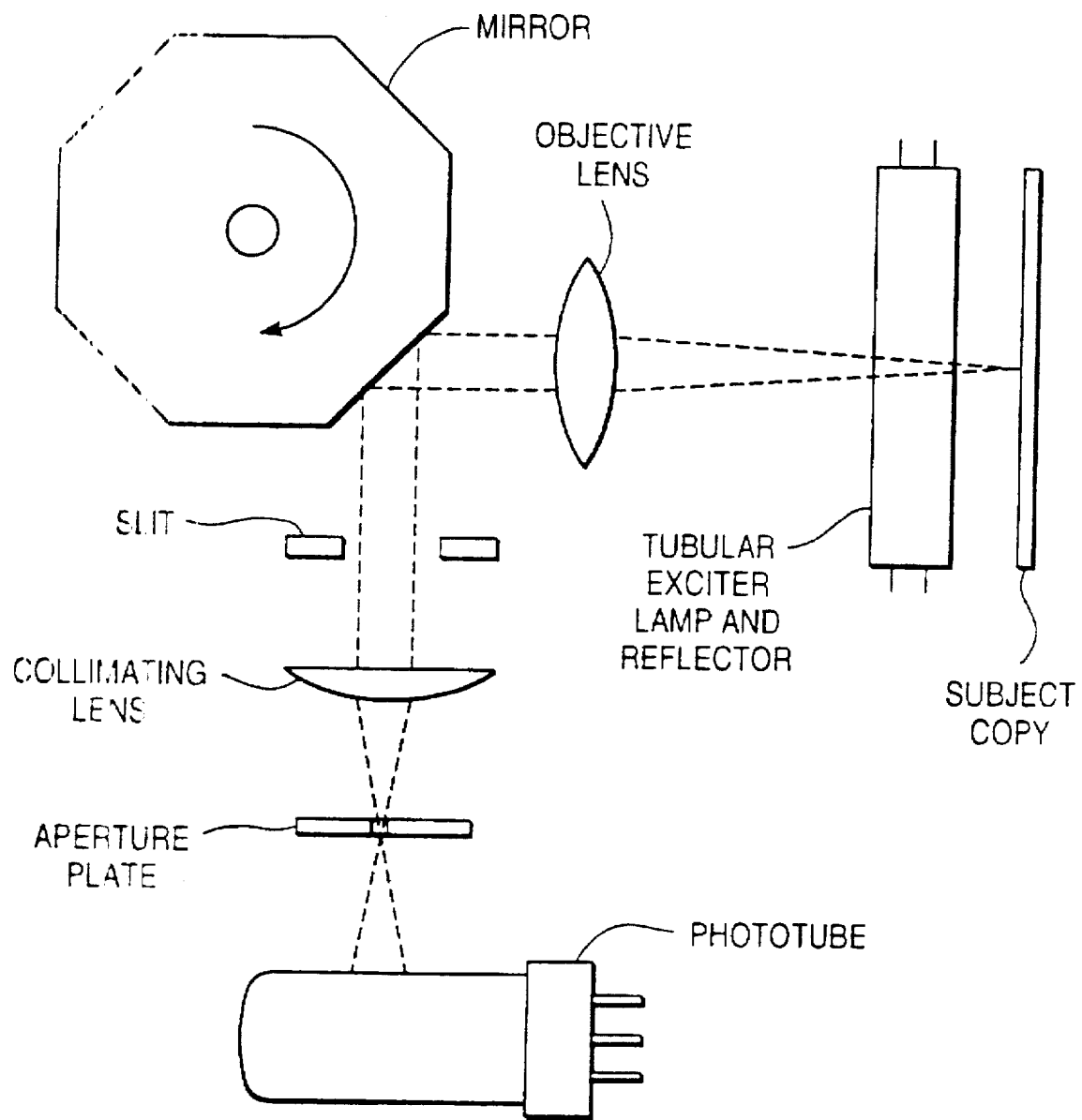
FIG_2 (PRIOR ART)

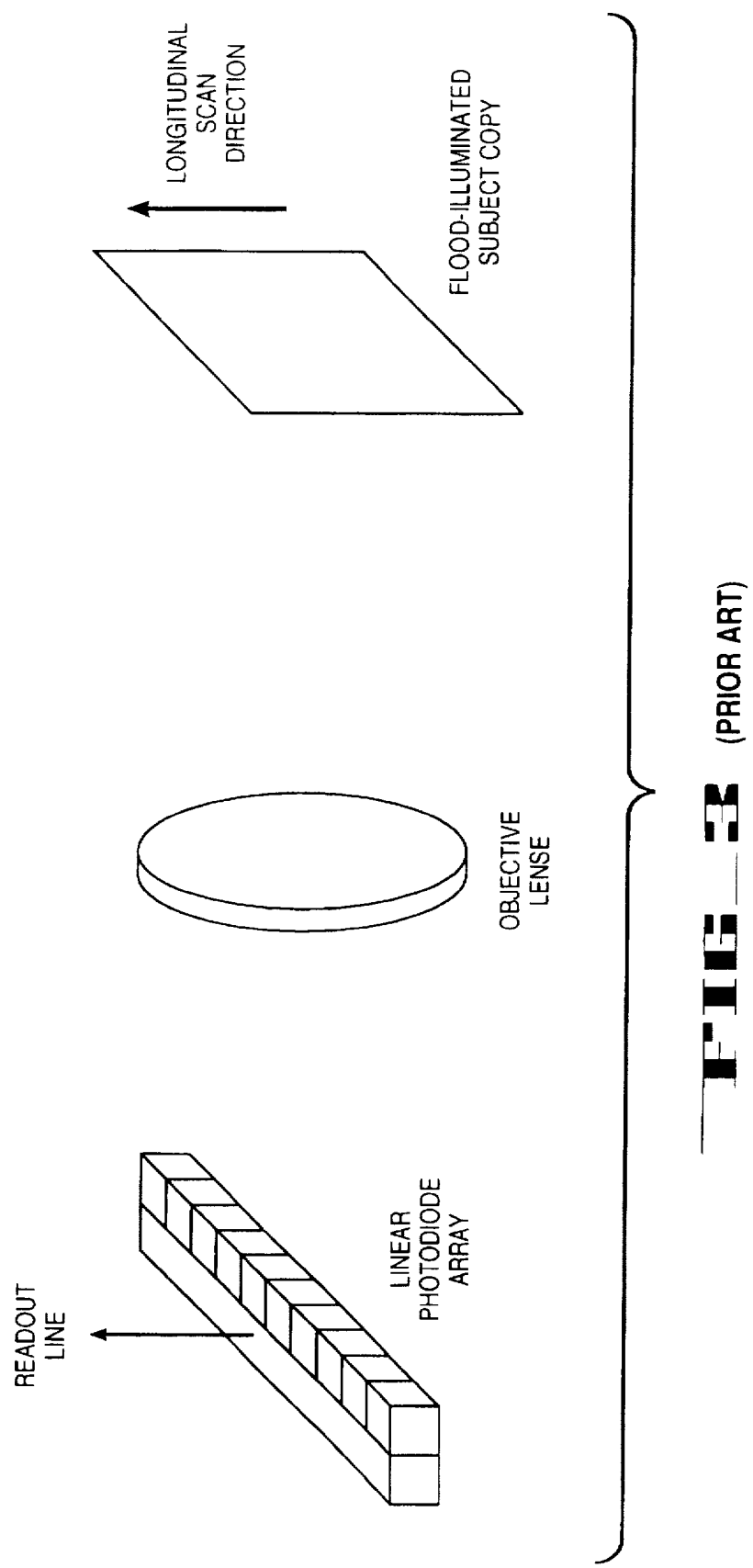
FIG_3 (PRIOR ART)

 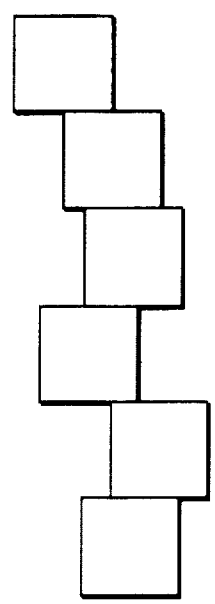 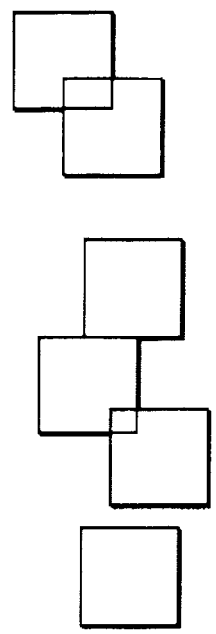
FIG 4A  FIG 4B  FIG 4C
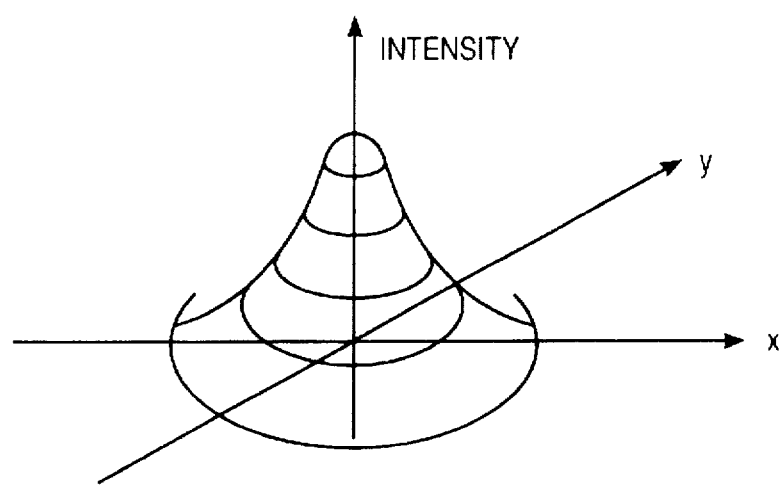
FIG_5

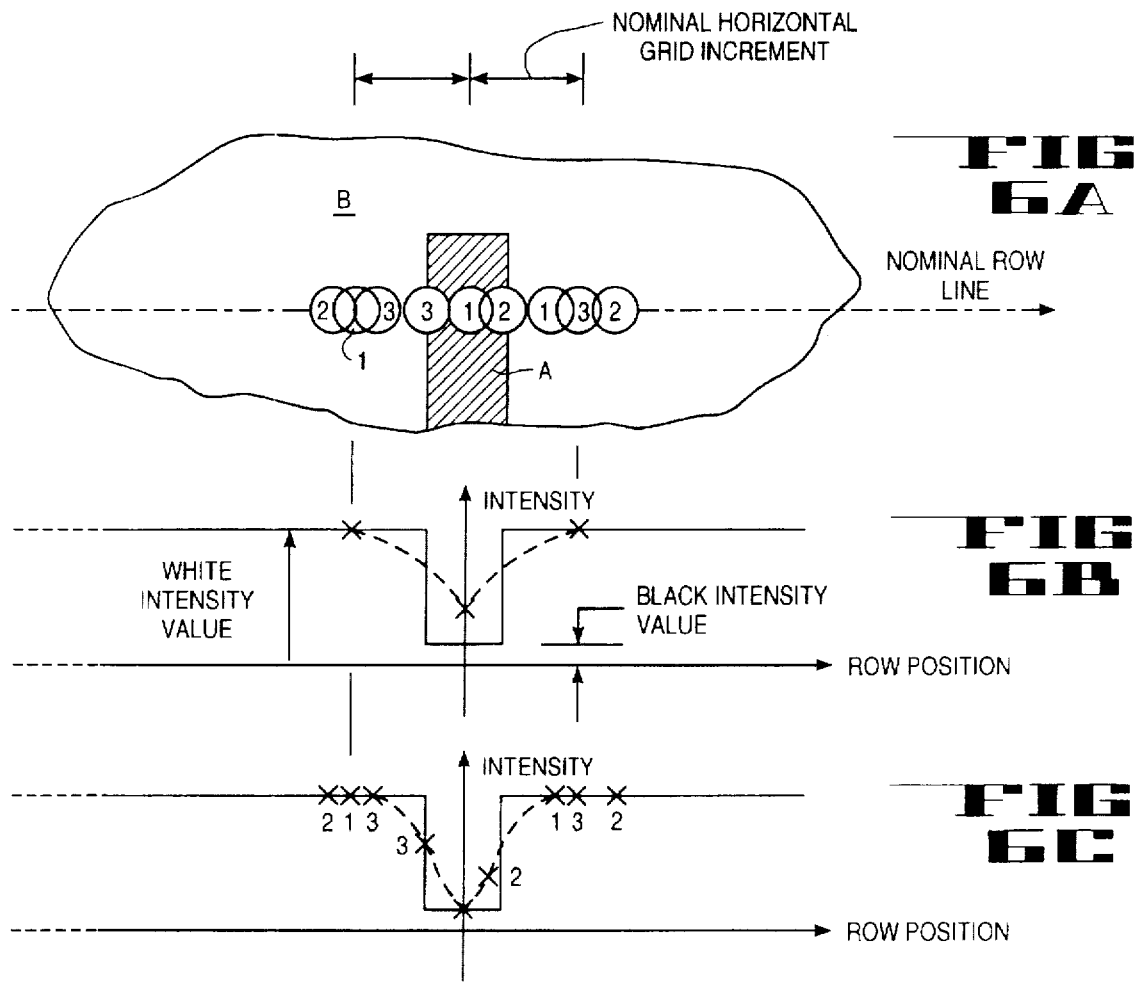
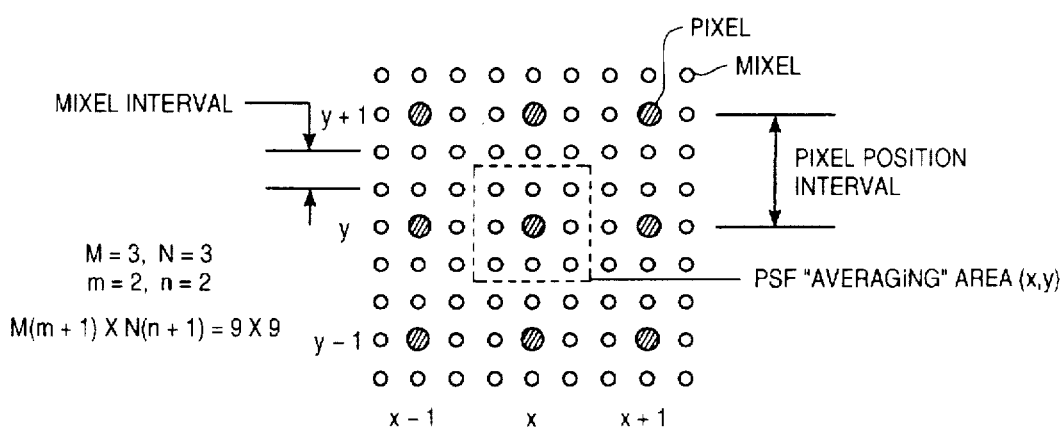

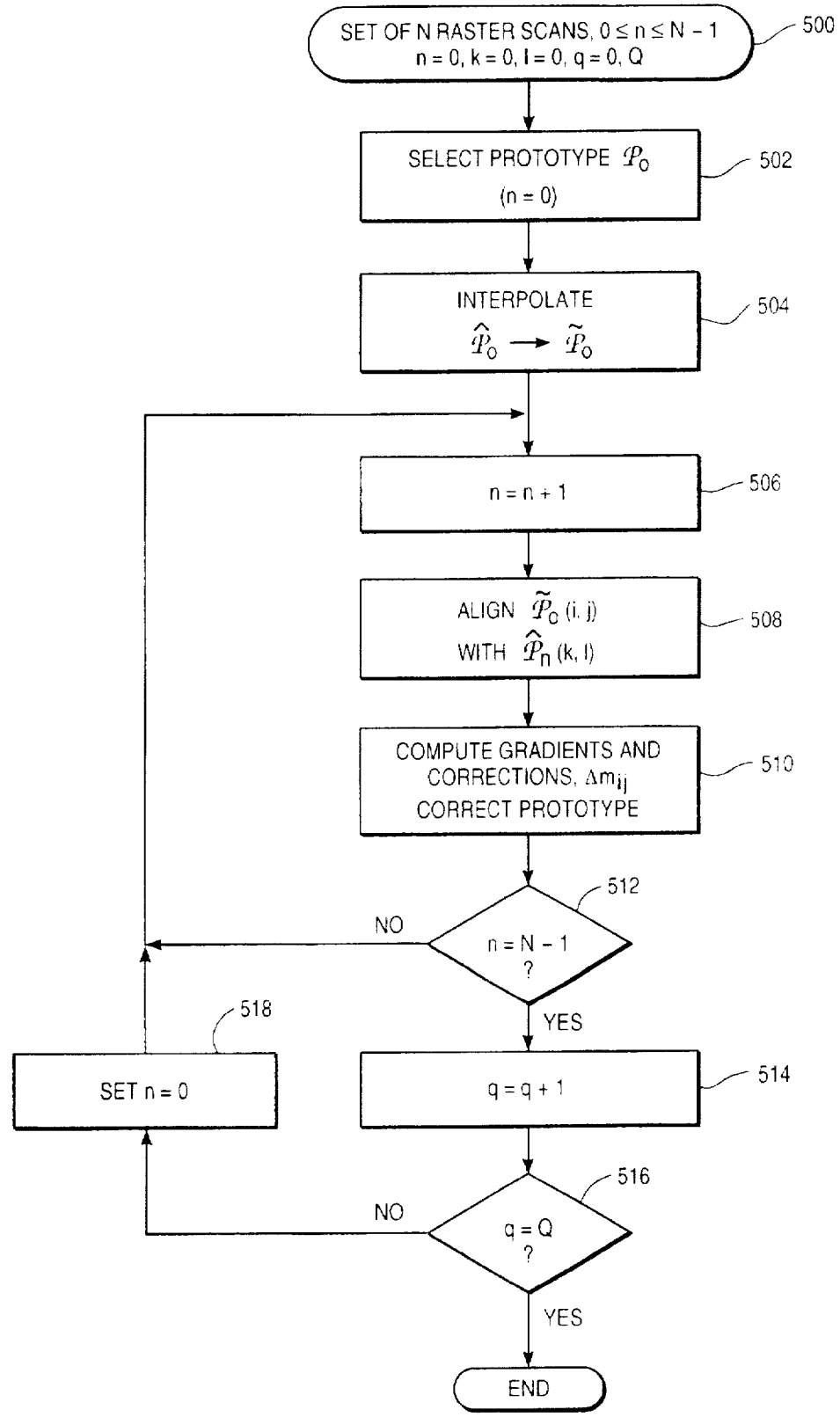
FIG_9

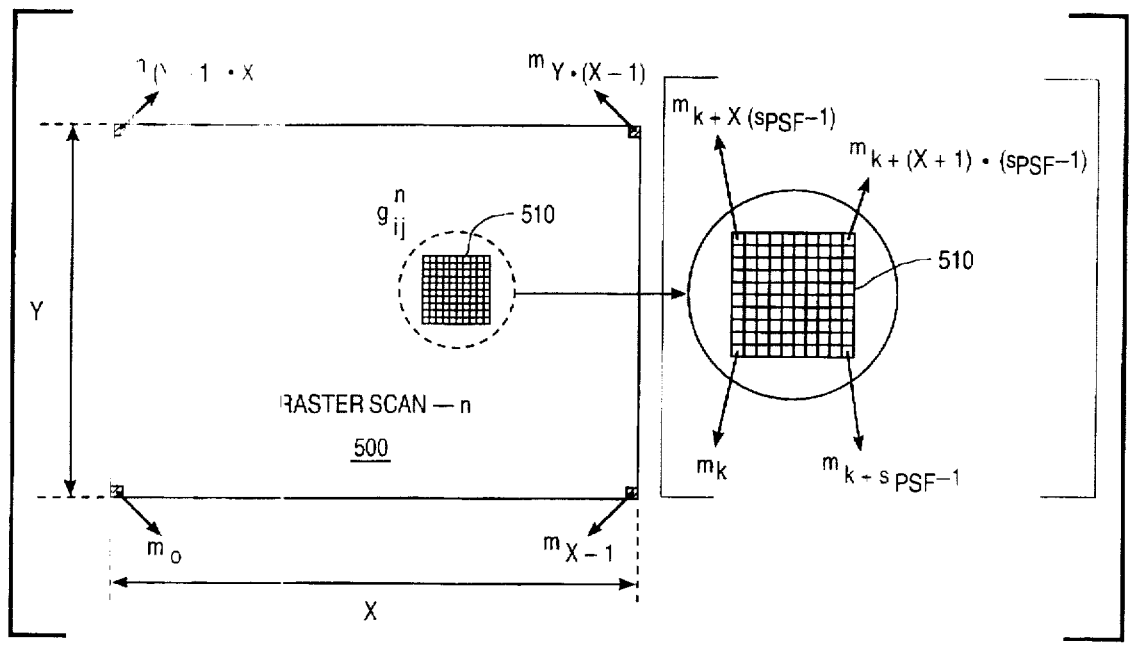
FIG_10
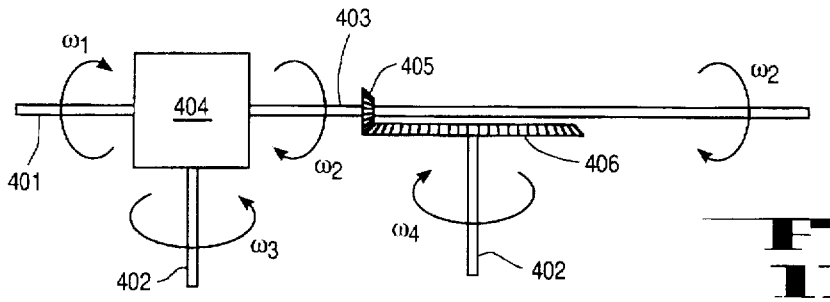
FIG 11A
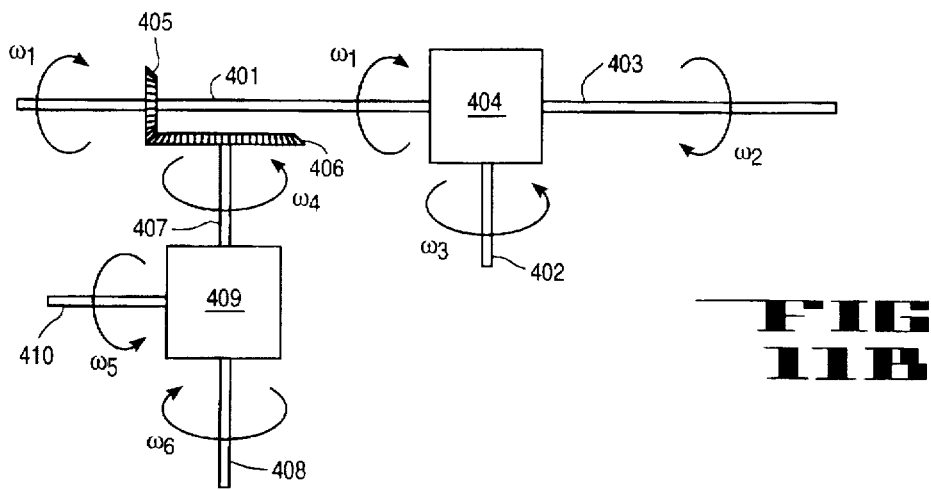
FIG 11B

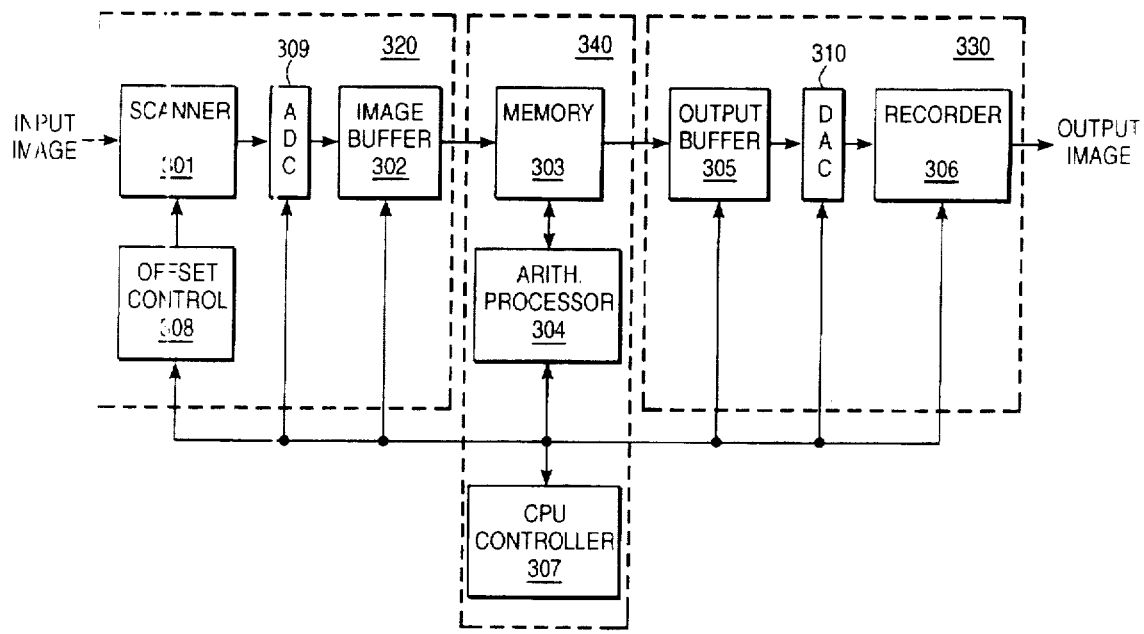
FIG_12
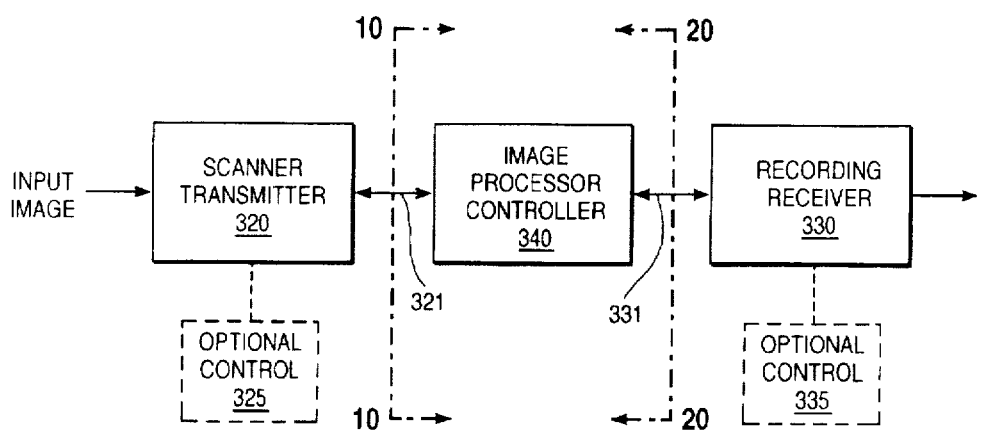
FIG_13

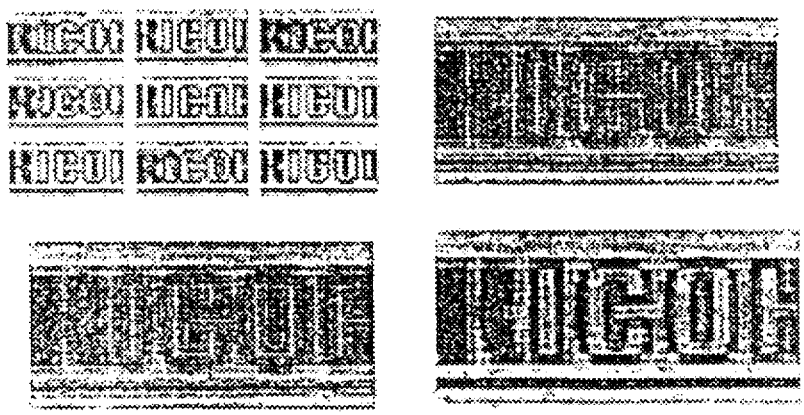
FIG. 14
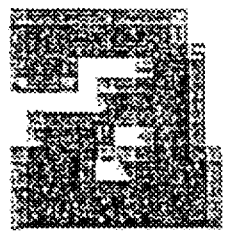
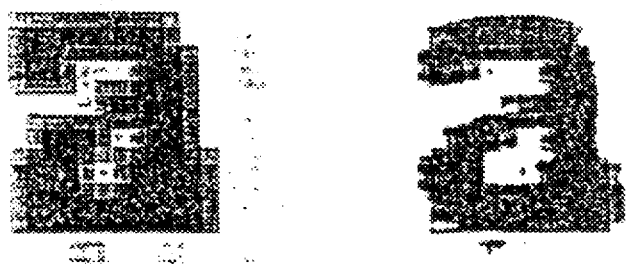
FIG. 15

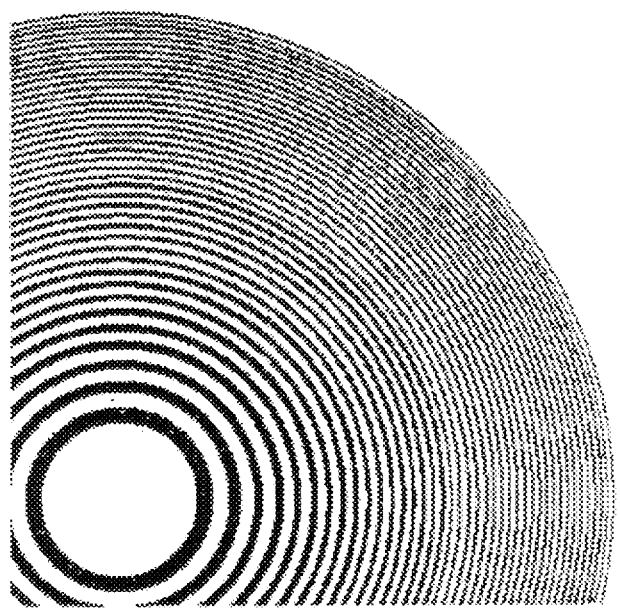
FIG_16
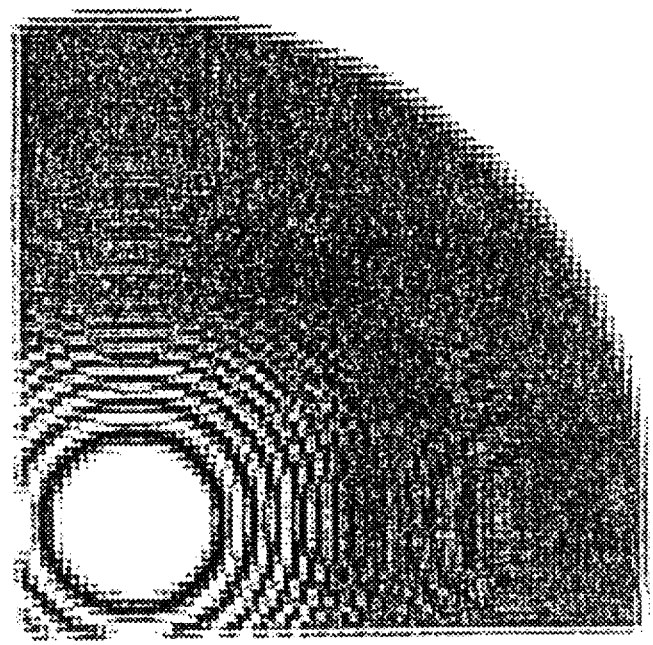
FIG_17

METHOD AND APPARATUS FOR COMBINING MULTIPLE IMAGE SCANS FOR ENHANCED RESOLUTION

FIELD OF THE INVENTION

The invention relates to the field of facsimile communications and more specifically to the use of multiple scans of the same image to make an improved resolution facsimile.

BACKGROUND OF THE INVENTION

Facsimile systems, used for the transmission of static images, have transmitters that include means for accepting an image to be transmitted, a scanner for extracting the image information by analyzing light reflectances from an illuminated image, and converting the detected reflectances into electrical signals for transmission to a receiver. The receivers have compatible recording mechanisms that accept the transmitted electrical signal and record the image corresponding to those electrical signals on a suitable recording medium.

Typically, a diffused light source is used for illuminating the subject image, and the effective aperture of the optical system defines the elemental area used to scan the document. International standards exist to ensure compatibility between transmitters and receivers. The facsimile electrical signals represent rasters or rectangular grids of rows and columns of elemental areas from which the subject image may be approximately reconstructed.

There are two basic types of scanners: the rectilinear and array scanner. The rectilinear type uses a single photocell that is swept across a row for detecting the diffused reflectances of the subject image as a continuous analog signal. The array scanner consists of a row of photocells (photodiodes or charge-coupled-devices (CCDs)), one for each elemental area in a row.

The scan methods are either mechanically or electrically implemented. The mechanical scan devices are typically either a rotating drum type, or a mirror type using either a polygon-shaped mirror or a rocking spherical mirror.

The drum type scanner (shown in FIG. 1) mounts the subject image around a drum that rotates at a constant angular velocity. The scanning optics traverses the subject image along a path parallel to the rotational axis of the drum, moving one elemental scanning units' height for each drum rotation and thus produces an electrical image as a series of raster scans.

The polygon mirror type, FIG. 2, scans a two-dimensional subject image by rotating a multi-sided mirror so as to cause an illuminated aperture to scan across the image rows. The rocking mirror type uses a d'Arsonval galvanometer movement driven by a saw tooth current to cause an illuminated aperture to scan across the subject image. Alternatively, a mechanical cam may be rotated so as to impart a scanning motion to the spherical mirror. Relative motion between mirror and subject image, in a direction orthogonal to the scan, allows an entire raster to be generated.

The electronic scanner types typically includes those based on vidicons and photosensitive arrays. The vidicons produce a television type raster from a diffused illuminated subject image. More commonly, a photosensitive array employing an objective lens forms an image on a linear array of silicon sensors as shown in FIG. 3. For example, the CCITT group 3 international telecommunications standard for digital facsimile specifies 1,728 sensors in a 1.02" row to view an 8 ½ wide subject image, while the CCITT group 2 standard for analog specifies the use of 3 sensor arrays of 512 photo-sensors each, for generating a line scan of 1536 pixels per sweep. (A pixel is a value representing the gray scale of an elemental area of a scan.) A linear array of 1728 silicon photodiodes may have photodiodes that each have apertures of 275 μ in ×630 μin.

The scanned raster electrical signals are a representation of the original image that include errors associated with the scanning process. These errors include optical aberrations, scan tracking errors caused by vertical and horizontal scan perturbations, and electronic system noise. The combination of these errors together with noise introduced by the communication channel and the reconstruction errors inherent in the facsimile receiver have limited the achievable image quality and resolution.

Thus, even if a perfect communication channel and facsimile receiver were to be available, any single image encoded by the raster scan would be limited by the errors generated at the source.

A more detailed description of facsimile systems may be found in the literature such as the "Electronics Engineer's Handbook", Donald G. Fink, Editor-in-Chief-, 2nd Edition, McGraw-Hill Book C., 1975, pp. 20–87 through 20–107.

SUMMARY AND OBJECTS OF THE INVENTION

Recognizing that the quality of any single raster scan of a facsimile subject image is limited by the initial scanning process that converts visual information to electrical signals, it is an object of this invention to provide a means for using multiple raster scans of the same subject image for the purpose of reconstructing a higher resolution image at the facsimile receiver than that obtained by any single raster scan through the use of statistical processing techniques.

An additional object is to define a means for improving the performance of an existing facsimile scanner by using a method and apparatus for generating multiple raster scan signals with prescribed statistical perturbations that facilitate improved image reconstruction.

Another object is a method for using existing facsimile scanners with higher resolution recorders for producing a destination image of higher resolution from an image scanner source of lower resolution.

Another object is a method and apparatus for the use of multiple raster scan techniques in television systems to provide greater resolution at the television receiver display than inherently contained in any one raster scan.

Another object is to provide a method for using low cost, low resolution, scanners in a high resolution facsimile or television system.

A further object is a method for character regeneration using multiple scanned instances of the same character in order to reconstruct a better character image representation of that character.

BRIEF DESCRIPTION OF THE DRAWINGS

The present invention is illustrated by way of example and not limitation in the figures of the accompanying drawings, in which like references indicate similar elements and in which:

FIG. 2 shows a rotating polygon mirror type scanner.

FIG. 3 shows a linear photo-sensitive array scanner.

FIG. 4 illustrates jitter and cogging scanning errors.

FIG. 5 shows a typical optical point-spread-function.

FIG. 6 shows the effects of horizontal scan jitter.

FIG. 7 shows the relationship between the mixel and pixel raster scan grid.

FIG. 9 is a flow-diagram of the image reconstruction process.

FIG. 10 shows a mixel cluster in a raster scan.

FIG. 11 shows differential gears used to introduce tracking displacement errors in a mechanical scanner.

FIG. 12 is a block diagram of an image resolution enhancement system.

FIG. 13 is a block diagram of a facsimile system providing a high resolution output image.

FIG. 14 is an example of image resolution enhancement.

FIG. 15 is an example of character regeneration or reconstruction.

FIG. 16 shows a 480×480 element Fresnel pattern used to compare the GD and MC methods.

FIG. 17 shows a scan of the Fresnel pattern using 91×91 pixel elements.

DETAILED DESCRIPTION

I. Introduction

Figure 1:
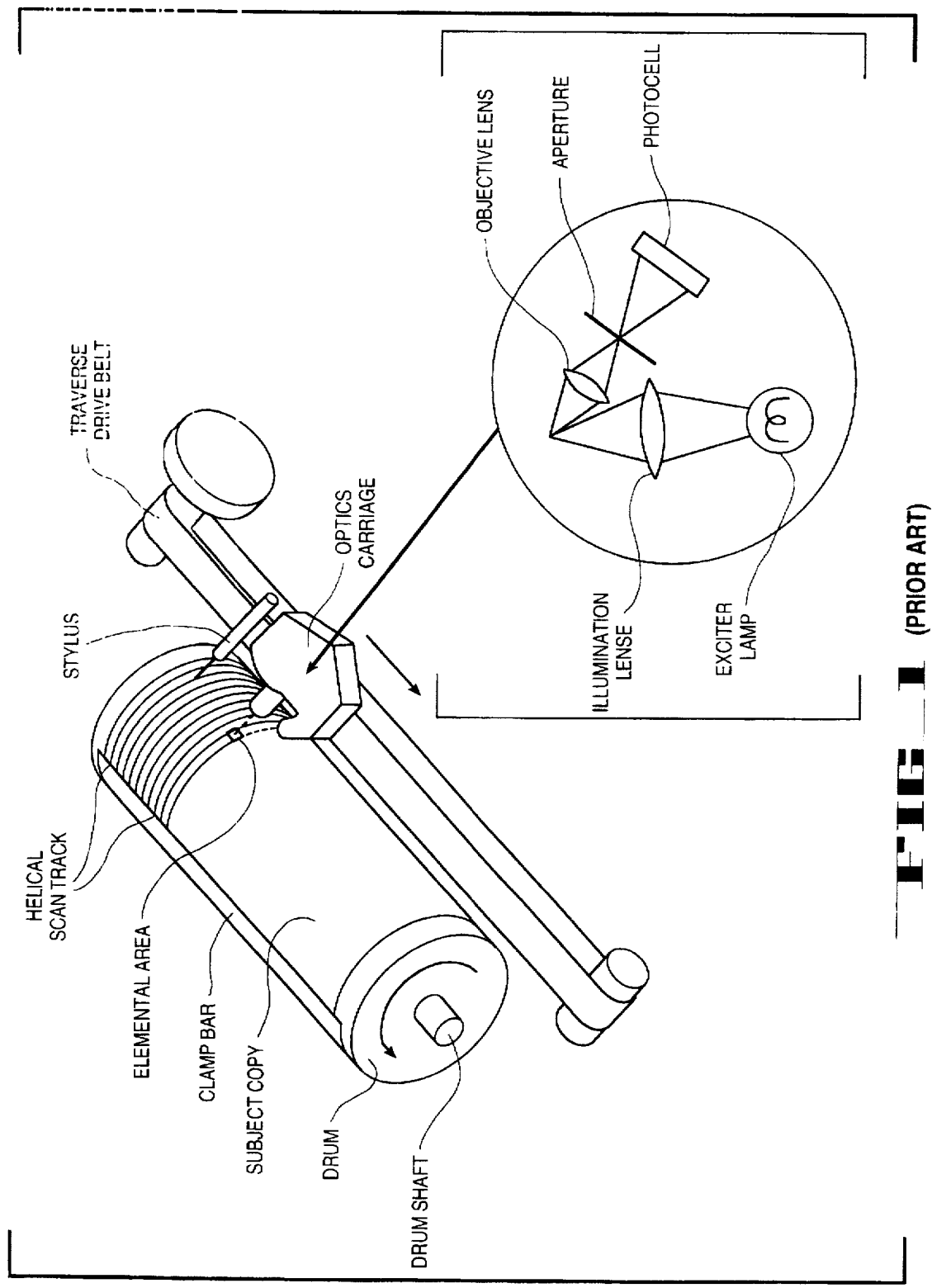
FIG. 1 shows a drum type scanner.

Scanning of an image on a page is done by sampling the intensity of reflected light with a sufficient density of samples so that an image reconstructed from the sampled intensities is an acceptable representation of the original image. The quality of representation is dependent on the size and density of the sampled intensities (pixels) and on the quality of optics and photo-sensors. Usually a single scanned image is used in the reconstruction of the original and hence the single image instance includes the defects of all the scanning and reconstruction methods and apparatus.

If the scanning system introduces errors into the raster scan image that are not consistent or repeated from scan-to-scan, then the sampled pixels will differ, from pass-to-pass, for nominally identical points of the subject image. But more importantly, these "different views" of the same object may contain additional details of the original image. These differences are typically due to photo-sensor positioning errors and the variability in the sensors and light source. The latter errors may be substantially attenuated by averaging techniques provided that the registration of a set of scanned image data is adequate. Thus, averaging implies either insignificant positioning errors or means for aligning individual image raster scans with one another.

More significantly, the registration errors caused by variations in the relative positioning of the sensors on different scans can provide additional information about the original image. To combine the information contained in multiple scans requires solving an inverse problem, i.e. given a set of scans and some knowledge of the scanning process, find the most probable original image.

The inverse problem is solved by defining a set of parameterized probabilistic relationships between the intensities of the original image and the pixels of the sample scans. A search is made for the maximum likelihood values for the parameters and the sampled pixel intensities.

II. Scanning Errors

In the following discussion it will be assumed that the scan raster is a rectilinearly sampled representation of the image, i.e., sampled in both the horizontal or row (x) direction and the vertical or column (y) direction. (Modern photo-sensitive arrays, such as CCD linear and two-dimensional arrays, naturally provide sampling along the row. Continuous analog raster scans along a row can be sampled by standard analog-to-digital converters to produce the two dimensionally sampled raster.)

It will also be initially assumed that the scanning mechanism introduces, on consecutive raster scans, relative positional errors of two types: "static" displacement errors affecting the global position of a raster; and "dynamic" errors perturbing the intended local (pixel) position as the scans are generated. The pixel position errors are assumed to be within ±½ pixel (or elemental area) of the intended position. Further, the dynamic pixel position errors are assumed to be distinct from raster to raster.

FIG. 4 shows the two types of local positioning errors commonly encountered: FIG. 4a) shows a column of elemental areas as they would be ideally positioned; FIG. 4(b) shows horizontal or jitter errors; and FIG. 4(c) shows a combination of jitter and cogging (vertical) position errors. In each case, the pixel position corresponding to an elemental area is assumed to be the geometric center of the corresponding elemental area.

A fundamental limit on the size of an elemental area is due to the finite aperture of the objective lens system used to produce a focused image on the photo-sensor. The minimum diameter of the elemental area (array disc) is inversely proportional to the lens diameter. Other optical defects, such as chromatic aberration, further increase the effective minimum elemental area. Consequently, any practical lens system can only resolve a point object on an image by observing the point and adjacent surrounding area simultaneously. The central light intensity is collected with minimum loss (maximum gain) in the central region and with increasing loss with distance from the center. This gain weighting function is known as the point-spread-function (PSF) of the optical system. FIG. 5 shows a typical gain characteristic for a PSF as a function of radial distance from the central axis through the point position. As a result, the intensity recorded at the output of the optical system is a weighted average of the intensity within the point-spread-function. Thus, high intensity points close to low intensity points well tend to "bleed" from high to low in accarding with the PSF. The optically detected image is a two-dimensional convolution of the original image and the PSF.

III. Improving Resolution

FIG. 6 shows how repeated scans over a given area of the image may improve resolution when horizontal jitter positioning errors occur from scan-to-scan (cogging errors are assumed to be absent). Sampled locations belonging to scans 1, 2 and 3 are indicated by PSF circles having numbers corresponding to the scan index (1, 2, 3) and are shown in FIG. 6(a). The central region of the image is shown to have a low intensity region A with a high intensely region, B, to either side and above.

If the intensities of the three successive set of samples in the row were averaged and assigned to their nominal positions, the data interpreted in this manner might be interpreted as representing a broad region of low intensity as shown in FIG. 6(b).

However, if the horizontal shifts due to jitter were to be known, the data could be interpreted as representing a narrower, better defined area of low intensity, and closer to the actual row intensity of the image.

Clearly, if cogging errors were present, and if the cogging error for each pixel were known, the vertical scattering of samples along a nominal row would also provide additional information about the image in the vertical direction.

This simple example demonstrates that a central issue to be addressed for increasing the effective resolution of a scanner is proper registration before super-imposing raster scans.

III. A. Gradient Descent (GD) Algorithm

An automated procedure for the super-imposing of raster scans includes five basic steps:

(1) assembling a set of N raster scans indexed 0, 1, 2, ..., Q-1 having K (rows)×L (columns);

(2) selecting one raster scan out of N to be the prototype raster scan with which all other N-1 raster scans are to be aligned;

(3) creating a higher resolution prototype by two-dimensional interpolation of the original K×L prototype sampled raster scan so that q additional sample points are generated between the original set of row samples and p additional rows are generated for each of the original K rows using all pertinent scanner parameter information available, thus creating a new high resolution prototype having K(p+1)(q+1) interpolated resolution elements called mixels from the original prototype having K×L pixels;

(5) selectively super-imposing each remaining and aligned raster scan on to the high resolution prototype raster to form an updated prototype by adjusting each mixel value so as to minimize a prescribed cost function that is based on the error between the updated prototype raster that has been convolved with the scanner PSF and the selected aligned raster scan.

The above procedure yields a K(p+1)(q+1) mixel updated prototype raster scan with all of the "cogged" and "jittered" raster scans contributing to its increased resolution.

In practice, it has been found advantageous to repeat steps (2)-(5), using the result of step (5) as the new prototype and computing new offset alignment values for the remaining N-1 raster scans. The added resolution to the prototype from the first pass allows for improved alignment in subsequent passes and further improvement in resolution. However, experimental results indicate that no practical increase in image resolution is achieved after two or three passes.

The effect of interpolating the prototype raster is shown in FIG. 7 where each pixel location is defined by a shaded circle. For the sake of simplicity, the PSF averaging area, i.e., the area covered by the optical point spread function (PSF) when centered at (x,y), is assumed to be rectangular as shown by the dotted outline. If, for each original pixel, $p_{xy}$, a new set of uniformly spaced sample value are introduced so that two-new values are interposed between $P_{xy}$ and its neighbors ($p_{x-1,y-1}$, $p_{x,y-1}$, $p_{x+1,y-1}$, $p_{x-1,y}$, $p_{x,y}$, $p_{x+1,y}$, $p_{x-1,y+1}$, $p_{x,y+1}$, $p^{x+1,y+1}$), an interpolated mixel grid results having $3^2=9$ times as many "resolution" elements as before. Thus each original pixel generates 9-1=8 new points.

The simplest interpolation scheme would assigned the value of pixel $p_{xy}$ to the closest new mixel values included within the dotted line of FIG. 7. This operation corresponds to convoluting the original pixel raster scan with the uniformly weighted two-dimensional kernel shown in FIG. 8(a) or equivalently represented in plan-view by FIG. 8(b) where the dots correspond to mixel location, and the number beside each dot is the value of that location. Clearly, this convolution kernel may be extended to cover more interpolated values in either the x or y direction.

Figures 8A, 8B, 8C:
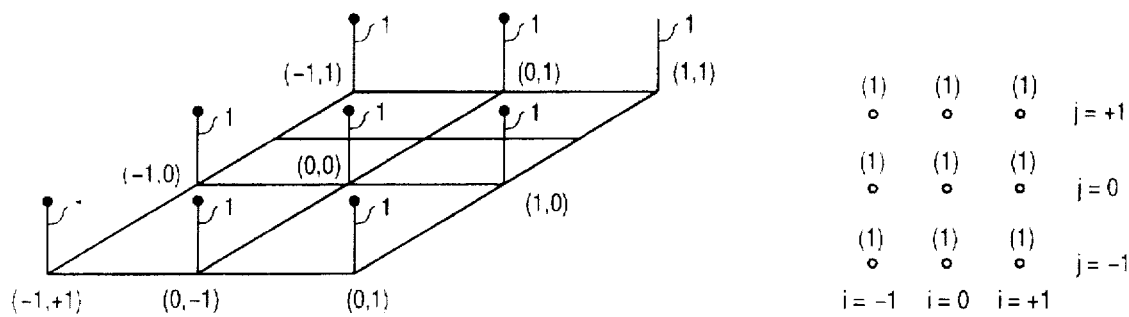
FIG. 8 shows examples of two-dimensional interpolating convolution kernels.

In most cases, the averaging area of the PSF extends beyond the half-way mark between adjacent pixels so that any interpolated mixel values may involve one or more adjacent pixels. FIG. 8(c) shows a "linear" interpolating two-dimensional kernel for the grid of FIG. 7 that produces straight-line interpolated mixel values between nearest pixel neighbors.

Other useful interpolating functions may use guassian or exponentially (rather than uniformly or linearly) weighted two-dimensional interpolating kernels, or the PSF interpolating kernel corresponding to the scanner PSF (if known) may be used.

The key point is that the interpolating process produces mixel values to fill in the high resolution grid of the prototype using the prototype pixel values and any other information that might help to establish a high resolution prototype raster scan as the starting point of the reconstruction process.

Having performed the raster scan interpolation on the prototype pixel raster scan, the high resolution mixel grid will be used to align each of the other raster scans exhibiting jitter and cogging errors relative to the prototype.

If $P_n(x,y)$ represents the original image intensity of the $n^{th}$ raster scan in the (x,y)-plane, then sampling the (x,y)-plane at uniform intervals yield the sampled raster scan $$\hat{P}_n(kx_0, ly_0) = P_n(x, y) \sum_{k,l} \delta(x - kx_0)\delta(y - ly_0),$$

where $x_0$ and $y_0$ represent the pixel intervals, k,l are indices (0, 1, 2, . . . ) that span the image plane, and $\delta(\cdot)$ is the Kronecker delta function ($\delta(x)=1$ if $x=0$, otherwise $\delta(x)=0$).

Let $P_0(kx_0, ly_0)$, be designated as the prototype, then the interpolation process results in a fine grid with increments of $x_0/m$ and $y_0/m$ so that the high resolution prototype may be represented as $$\tilde{P}_0\left(i\left(\frac{x_0}{m}\right), j\left(\frac{y_0}{m}\right)\right).$$

Because absolute static positional errors are not known, these positional errors for each non-prototype scan are referenced to the prototype so that the prototype includes $\Delta x_n$ and $\Delta y_n$, the relative static (or average) positional differences between the $n^{th}$ scan and the prototype. The interpolated prototype scan relative to the $n^{th}$ raster scan may be represented as follows:

$$\tilde{P}_0\left(i\left(\frac{x_0}{m}\right), j\left(\frac{y_0}{m}\right), \Delta x_n, \Delta y_n\right).$$

Thus, for each scan, $\hat{P}_n(kx_0, ly_0)$, it is required that $\Delta x_n$ and $\Delta y_n$ be determined in order to establish the proper registration of $\hat{P}_n(kx_0, ly_0)$ with $$\tilde{P}_0\left(i\left(\frac{x_0}{m}\right), j\left(\frac{y_0}{m}\right), \Delta x_n, \Delta y_n\right)$$

by expressing $\Delta x_n$ and $\Delta y_n$ in terms of the mixel indices, (i,j), of the high resolution elements $(x_0/m)$ and $(y_0/m)$.

A cost function representative of the differences between $\tilde{P}_0$ and $\hat{P}_n$ is used to establish the relative registration by minimizing the cost function. A simple cost function choice is a quadratic error function as given by $$E^2 = \sum_{k,l} \{\tilde{P}_0(i,j, \Delta x_n, \Delta y_n) * \overline{PSF}(i,j) - \hat{P}_n(kx_0, ly_0)\}^2$$

-continued where $$\tilde{P}_0(i, j, \Delta x_n, \Delta y_n) = \tilde{P}_0\left(i\left(\frac{x_0}{m}\right), j\left(\frac{y_0}{m}\right), \Delta x_n, \Delta y_n\right),$$

* indicates a convolution operation, and $\overline{PSF}(i, j)$ is the PSF function sampled at mixel intervals (i,j) so that when convolved with $\tilde{P}_0$ it combines m×m mixels to correspond to the pixel value $\hat{P}_n(k,l)$.

The estimates of $\Delta x_n$ and $\Delta y_n$ may then be approximated by finding the values of $\Delta x_n$ and $\Delta y_n$ that minimize $E^2$.

Alternatively, the offsets may be found by maximizing the cross-covariance term $$\max_{\Delta x_n, \Delta y_n} \sum_{k,l} \{\tilde{P}(i, j, \Delta x_n, \Delta y_n) * \overline{PSF}(i, j)\} \cdot \hat{P}_n(kx_0, ly_0)$$

with respect to the offsets, $(\Delta x_n, \Delta y_n)$.

In either case the range of $\Delta x_n$ and $\Delta y_n$ will usually be less than the pixel increments, $x_0$ and $y_0$, respectively, so that only a limited range of $\Delta x_n$ and $\Delta y_n$ pixel increment shifts need be explored.

A further reduction in computations may be made if the fine detail information is restricted, a priori, to a given important region or regions of the raster scan by limiting the above computations to values of k and l that fall within those regions.

It should be noted that in addition to jitter and cogging tracking errors, rotational tracking errors may also be present. Rotational tracking errors are due to a relative angular displacement in the image plane relative to the scanner horizontal and vertical axis. Although dynamic (raster scan to raster scan) rotational errors are usually small compared to jitter and cogging errors, their effects may also be minimized by including a rotational adjustment procedure for aligning each raster scan relative to the prototype that minimizes an appropriate cost function.

In the case of the simple quadratic cost function expression given previously, the expression may be modified to include a relative rotational displacement, $\Delta \theta_n$, of the $n^{th}$ raster scan, $\tilde{P}_n$, relative to the prototype raster scan, $\tilde{P}_o$, as follows:

$$E^2 = \sum_{k,l} (\{\tilde{P}(i, j, \Delta x_n, \Delta y_n, \Delta \theta_n) * \overline{PSF}(i, j)\} - \hat{P}_n(kx_0, ly_0))^2$$

Approximations of $\Delta x_n$, $\Delta y_n$, and $\Delta \theta_n$ would be obtained by finding the values of these three offsets that minimize $E^2$.

Although the simple quadratic cost function has been used, it is possible to use a more general cost function that may include various difference (distance) metrics and weighting functions. (For example, see "Quantitative Dissemblance Measures" in "Digital Pattern Recognition", Fu, K. S., editor, Springer-Verlag, N.Y., 1976, pp. 52–53).

Having obtained the offsets required to align the prototype raster scan to the $n^{th}$ raster scan, it is feasible to incorporate the details contributed by the $n^{th}$ raster scan into the prototype. In order to do this, it is necessary to solve the, so called, inverse statistical modeling problem: find the most probable image that would cause a given scanner to produce the set of N raster scan exemplars. This inverse probability is given by Bayes' Rule as $$P(I|\hat{P}_n) = P(\hat{P}_n|I) \cdot P(I)/P(\hat{P}_n)$$

where $P(I|\hat{P}_n)$ is the probability of original image I given raster scan $\hat{P}_n$, $P(\hat{P}_n|I)$ is the probability of raster scan $\hat{P}_n$ given the original image intensity, and P(I) and $P(\hat{P}_n)$ are the priori probabilities of image intensity I and $\hat{P}_n$ occurring (independent of the set of data collected).

Because P(I) and $P(\hat{P}_n)$ are independent of the data set (raster scans) their rates may be treated as a constant for any given data set. Therefore, maximization of $P(I|\hat{P}_n)$ can be implicitly achieved by maximizing $P(\hat{P}_n|I)$, i.e. by finding image the intensity values I that maximize the probability of value $\hat{P}_n$ being generated.

The $n^{th}$ raster scan may be expressed in terms of the original image, I, as $$P_n(x,y) = PSF\{I, x, y, \Delta x_n \Delta y_n\} + N(o, \sigma)$$

where PSF{·} is the scanner's point spread function operation on image I having an absolute dependent error of $\Delta x_n$ and $\Delta y_n$, and additive guassian noise, N with zero means and standard deviation of $\sigma$. The noise component represents the variability in scanner output for a given image intensity, I. Thus, the component may be expressed as a difference, $$N(o, \sigma) = PSF\{I, x, y, \Delta X_n, \Delta y_n\} - P_n(x,y),$$

which implies the following guassian probabilistic model $$P\{P_n(x, y)|I, \Delta x_n, \Delta y_n\} = \frac{1}{\sigma \sqrt{2\Pi}} \Sigma e^{-N^2(o, \sigma)/2\sigma^2}$$

The problem with using this expression is that it requires knowledge of the original image intensity, I, the information that is being sought.

In order to circumvent this problem, the prototype image is used an initial image and an iterative search is conducted to find the set of mixel values that minimize a quadratic error (cost) function by minimizing the difference between the prototype image $\tilde{P}_0(i, j)$ and raster scan image $\hat{P}(k,l)$.

$$\xi_n^2 = \min_{\{m_{ij}\}} \Sigma (\tilde{P}_0(i, j) - \hat{P}_n(k, l))^2$$

where $\{m_{ij}\}$ is the trial set of mixel values that were operated upon by the PSF to form $\tilde{P}(i, j)$, or $$\tilde{P}(i, j) = \sum_{r,s} psf_{i+r, j+s} \cdot m_{i+r, j+s}.$$

where $psf_{i+r, j+s}$ is the value of PSF at r and s units from its central value at i,j. The summation is over indices r and s, covering the effective area that the PSF encompasses when located at indices i and j. The mixel values implicitly incorporate any registration shifts $\Delta x_n$, $\Delta y_n$.

Because the minimization of error due to a specific mixel, $m_{ij}$, is adjusted locally, we find the gradient/component with respect to mixed value $m_{ij}$ of the local error function for a single pixel of $\hat{P}(k, l)$ as $$\frac{\partial \xi_{i,j,n}^2}{\partial m_{ij}} = \frac{\partial}{\partial m_{ij}} (\tilde{P}_0(i,j) - \hat{P}_n(k,l))^2$$

$$= \frac{\partial}{\partial m_{ij}} \left( \sum_{r,s} psf_{i+r,j+s} \cdot m_{i+r,j+s} - \hat{P}_n(k,l) \right)^2$$

$$= 2(\tilde{P}(i,j) - \hat{P}_n(k,l)) psf_{i,j}$$

Because of stability consideration in this stochastic approximation process, the actual correction applied to the value of $m_{ij}$ should be only a fraction, $\alpha/2$, of the total gradient and in the opposite direction to the gradient so that the correction becomes $$\Delta_n m_{ij} = -\alpha(\tilde{P}(i,j) - \hat{P}_n(k,l)) psf_{i,j}$$

and the new value of $m_{ij}$ is $$m_{i,j,n} = m_{i,j,n-1} + \Delta_n m_{ij}$$

Experimental results have indicated that when $\alpha=0.001$, stable estimates are achieved.

In summary, the mixel value, $m_{ij}$, of the prototype is updated by estimating the gradient with respect to $m_{ij}$ of the error function at pixel location (k,l) which is based in the difference between the prototype mixel values, {mjj} transformed by the PSF to form the $(n-1)^{th}$ updated estimate of the actual image as it would appear after being scanned by the particular scanner with the PSF used in the estimation.

Thus, the initial prototype image that was interpolated to have a high resolution set of mixels is updated by adjusting the prototype offsets to match the image $\hat{P}_1(k,l)$ and then adjusted by using the above gradient technique to modifying the mixel values. The next iteration involves image $\hat{P}_2(k,l)$ and the updated prototype. And so on, until all available sample images are used. The result is high resolution image approximating the original image that was degraded by the scanner's PSF and raster tracking (jitter and cogging) errors.

As previously stated, it has been found advantageous to use, as an initial prototype, the enhanced prototype image obtained after processing the set of available data, omitting the interpolation step, and then finding new offsets for each raster scan ($\Delta x_n$, $\Delta y_n$) and computing a new set of prototype mixel values.

FIG. 9 is a flow diagram of the described method for combining multiple image scans to obtain an improved resolution image. The process begins at step 500 where it is assumed that a set of N scans of the same image are available and arbitrarily ordered by index n ($0 \leq n \leq N-1$), and the n and q indices are set to zero. At step 502 image $\hat{P}_n$, n=0, is selected as the prototype and is interpolated to the desired resolution in step 504. Index n is incremented at step 506 and $\hat{P}_0$ is aligned with $\hat{P}_n$ in step 508. After alignment, gradient elements and prototype mixel corrections {$\Delta m_{ij}$}, are computed and applied to the set of prototype mixels {$m_{ij}$} yielding an updated prototype approximating the original image represented with the resolution introduced by the interpolation step 504. Test step 512 checks if all N original image scans have been processed to update the prototype, and if so, increments reprocess index q in step 514 which is tested in step 516 to determine of the number of reprocessing passes has been computed, and if not, step 518 resets image scan index, n, to zero and returns the process to step 506. Otherwise, the process ends.

It should be noted that it may be desirable to alter the sequence of image scans by reordering scan images (n=1 through (N−1)) in step 518 in order to improve the effectiveness of a reprocessing pass by changing the order in which the images affect the prototype.

In the above description, the static and dynamic alignment errors were assumed to be caused by inherent errors in the scanner mechanism resulting in largely unknown alignment errors from one scan to the next. However, it can be advantageous to intentionally introduce alignment errors into the scanning mechanism in order to realize improved resolution of the reconstructed set of images.

For example, consider a scanner that is free of static and dynamic alignment errors. The remaining errors would be mainly due to the PSF and system (e.g. electronic) noise. Except for alignment step 508, the method outlined in FIG. 9 could be used to reconstruct a higher resolution image based solely on knowledge of the scanner PSF or by use of a reasonable estimate of the scanner PSF. In effect, the method of FIG. 9 would perform a deconvolution of the PSF operating on the original image to yield a "sharper" estimated representation of the original image. Alternatively, any well known technique for deconvolution, such as indirect frequency domain operations, may be used to perform the two-dimensional deconvolution. However, without the introduction of scans providing differing views of the image, the improvement gained by deconvolution of the PSF is limited.

III. B. Mixel Clustering (MC) Algorithm

In any practical system for enhancing the resolution of a scanned image, the computational burden of the algorithm used is of importance. Because of the large dimensionality of the problem, an iterative gradient descent (GD) approach was used to adjust each mixel value of the prototype and thereby avoid the impractical inversion of a huge matrix. The disadvantage of this method is the large number of operations per iteration which is on the order of $n_{psf}^2 \cdot n_x \cdot n_y \cdot n_s$ where $n_{psf}$ is the width or height of the PSF in mixel units, $n_x$ is the number of pixels per scan in the x direction, $n_y$ is the number of pixel units in the y direction, and $n_s$ is the total number of raster scans.

A more efficient and effective method, herein after referred to as mixel clustering (MC), provides a way to accelerate the iterative process and improve the effective resolution relative to the GD method.

The MC method accelerates the iterative solution by creating a set of zones, {$z_i$}, that are subsets of a rectilinear array of pixels or mixel. Adjustments to the prototype mixel values are made by solving the inverse problem directly by inverting a matrix with the mixel dimensionality of a zone. The zone dimensions are typically of the same order as the dimensions of the PSF. Iterations on the zones adjusts for any interaction of common mixels shared by zones and produces a homogeneously enhanced image.

The MC method is best explained by redefining the quadratic cost function, $E^2$, for follows:

$$E^2 = (P \cdot x - g)^T (P \cdot x - g)$$

where x is a column vector of length equal to the number of mixels (X·Y) in the prototype image, or $$x = [m_0 \ldots m_{x-1}, 900 \, m_x \ldots m_{2x-1}, 900 \, m_{(y-1)x-1} \ldots m_{xy-1}]^T,$$

X is the total number of horizontal mixel elements,

Y is the total number of vertical mixel elements, $m_{px+q}$ corresponds to the value of mixel, $m_{pq}$, of the original prototype coordinate system, g is a column vector of pixels values with a length equal to the total number of pixel elements, $N_p = X_p \cdot Y_p$, in the original raster scan, or $g=[g_0 g_1 \cdots g_k \cdots g_{N_p-1}]^T$, $g_{ix_p+j}=g_{ij}$, the pixel value at coordinates (i,j) of the original pixel coordinate system, T represents the transpose operator, and $P=[P_0 \vdots P_1 \vdots P_k \vdots \ldots P_{N_p-1}]^T$ where $P_k$ is the $k^{th}$ row of P such that $P_k \cdot x = g_k$ and $x^T \cdot P^T \cdot P \cdot x = g^T g = \int_\Omega (psf*I)^2 d\Omega$ where psf*I indicates the convolution of the original image, I, with the psf, and $\Omega$ is the plane of the image.

Thus, matrix P has row vectors, $\{P_k\}$, which represents a set of PSF weights that span a rectangular area corresponding to the area spanned by the PSF and centered at coordinate (i,j) corresponding to pixel value $g_{ix_p+j}=g_{ij}$ and $k=iX_p+j$. Consequently, each row vector, $P_k$, has elements that are mostly zero.

Adjacent pixel elements may be grouped or clustered to define a zone that satisfies the following relationship $\bar{P} \cdot \bar{x}_i = \bar{g}_i i=1,2,\ldots,n_p$ where $\bar{P}$ is a matrix row vector from P that correspond to the pixels and mixels that belong to zone $Z_i$, $g_i$ is a column vector of elements from g that correspond to the row vectors in zone $Z_i$, and $\bar{x}$ is a subset of x corresponding to the mixels that fall within the zone. FIG. 10 shows raster scan 500, the $n^{th}$ scan of a set having X horizontal mixels and Y vertical mixel elements. Mixel cluster 510, centered about pixel $g_{ij}$, is $S_{PSF}$ mixel elements wide and high.

The MC solution for $\bar{x}_i$, the mixel values of zone $Z_i$ which minimizes the quadratic cost function, $E^2$, is given by the following iterative relationship for zone $Z_i$ as follows:

$\bar{x}_i(m+1)=\bar{x}_i(m)+\bar{P}^T \cdot (\bar{P} \cdot \bar{P}^T)^{-1} \cdot (\bar{g}_i - \bar{P} \cdot \bar{x}_i(m))$ where $\bar{x}_i(m)$ is the $m^{th}$ iterative approximate value and $\bar{x}_i(0)$ is the initial set of mixel values.

The above expression for $\bar{x}_i$ requires the explicit inversion of the matrix $\{\bar{P}_i \cdot \bar{P}_i^T\}$, one inversion for each zone. The number of matrices in the set $\{\bar{P}_i \cdot \bar{P}_i^T\}$, can vary from 1 to $n_p$, these extremes corresponding to inverting the full P matrix as a zone (impractical) and inverting a zone of mixels corresponding to a single pixel (too slow). Generally, the number of operations involved will be minimum for a value between these extremes that corresponds to a minimum created by the monotonically increasing number of operations due to the zone matrix size and the monotonically decreasing number of operations due to number of mixel updates with increasing zone matrix size. The matrix, $\bar{P}^T (\bar{P} \cdot \bar{P}^T)^{-1}$ is computed only once and stored for future use in evaluating the mixel values of any zone.

The iterative procedure is applied "round robin" to each cluster. In this manner any overlap regions between zones, due to PSF or tracking error spread, are adjusted by each of the overlapping zones affecting the overlapped mixel elements. The process is essentially as defined by FIG. 9 except that the process of step 510 is replaced by the process represented by the above expression for $\bar{x}_i(m)$ and is then repeated for all zones, $\{z_i\}$, before proceeding to step 512.

The number of operations involved in the MC algorithm is $(n_c n_s)^3$ for the matrix inversion plus the number of operations per iteration which is proportional to $n_s n_x n_y / n_c$.

the non-overlapping width in x of the zone plus the range in $\Delta x$, and the overlapping range in height of the zone plus the range of $\Delta y$.

IV. Introducing Tracking Variations

Additional resolution information can be obtained by deliberately introducing static registration errors in both the X and Y directions, separately or together. For example, a subset of scans could be generated by introducing a distinct offset for each scan in the horizontal (X) direction by introducing a different $\Delta X$ shift for each raster scan and another subset by introducing a distinct $\Delta Y$ shift for each raster scan. Also, a known, distinct, static X and Y offset could be introduced into each raster scan.

Because the offset associated with each raster scan is known, the initial values for $\Delta X_n$ and $\Delta Y_n$ in the reconstruction method of FIG. 9 would be known allowing an initial value of $\Delta X_n$ and/or $\Delta Y_n$ to be used in the alignment procedure of step 508. If the remaining alignment errors were to be sufficiently small, the iterative procedure for alignment could be eliminated and a deterministic alignment procedure removing known displacements relative to the interpolated prototype raster scan would suffice to achieve a higher resolution image. Alternative, the iterative procedure could be retained for correcting for any unknown offset errors.

Another embodiment would introduce dynamic random or pseudo-random shifts from row-to-row, column-to-column, or pixel-to-pixel. This might increase the complexity of implementation by requiring the superposition of dynamic variations in the drive as well as increasing the amount of data required to store the introduced dynamic shifts. However, having stored this information, it can be used to establish the offset values of $\Delta x_n$ and $\Delta y_n$ in step 508.

FIG. 11 shows two embodiments for introducing intentional displacement variations in a scanner drive system such as shown in FIG. 1. In FIG. 11(a), shaft 403 is the drive shaft for the drum holding the image to be scanned. Beveled gear 405 is attached and rotates with shaft 403 at an angular velocity of $\omega_2$. Beveled gear 406 is coupled to gear 405 for providing a right angle rotational transformation and may also provide a reduction of angular velocity from $\omega_2$ to $\omega_4$ on shaft 407, the traverse belt drive shaft. The necessary torque to drive drum shaft 403 is provided by differential gear 404 which is driven by a suitable motor and an angular speed of $\omega_1$ and another source of rotational motion, $\omega_2$, at input shaft 402. The well known angular velocity relationships governing differential gear 404 are of the form $\omega_2 = \omega_1 - \omega_3/r$ where r is an internal gear ratio relating $\omega_1$ to $\omega_3$ when $\omega_2=0$, or $\omega_2$ to $\omega_3$ when $\omega_1=0$.

If $\omega_3=0$, then $\omega_1=\omega_2$ and shaft 403 is driven at the same angular velocity as shaft 401. However, if angular velocity $\omega_3$ is applied to shaft 402 the angular velocity of drum shaft 403 is perturbed in accordance with the above relationship causing jitter in the X-direction. Because traverse belt drive shaft 407 is coupled to shaft 403 by gears 405 and 406 a scaled perturbation in the Y-direction introduces cogging. Static shifts may be introduced by memory applications of angular velocity to shaft 402, the resulting shift being the time integral of the momentary angular velocity perturbation.

Clearly, independent X and Y perturbations can be introduced using separate differential gear assemblies to add the angular velocity perturbations to the rotation of the drum shaft and traverse belt drive shaft as shown in FIG. 11(b). Shaft 401 is the main drive shaft driven at angular velocity $\omega_1$. Differential 404 is driven by shaft 401 and shaft 402 which provides the angular velocity perturbation $\omega_3$ on output shaft 403 which rotates at $\omega_2=\omega_1-\omega_3/r$. Bevel gear 405 through bevel gear 406 driver shaft 407 at an angular velocity of $\omega_4$ which is applied to one input of differential 409. The other input to differential 409 is shaft 410 driven at an angular velocity of $\omega_5$ so that output drive shaft 408 rotates at $\omega_6=\omega_4-\omega_5/r$. In this manner, the tracking offset errors in both X and Y directions can be made independent.

Static and dynamic shifts may also be introduced by moving the image relative to the scan mechanism including the use of offset current in scanning mirrors controlled by d'Arsonval movement and the relative motion between a video camera and the image subject. Similarly, electro-optical scanning perturbations may be introduced by small stepping motors that move the scanning mechanism with respect to the image. Two motors, one for movement in the X-direction and the other in the y-direction, or a single motor for moving in a diagonal direction.

Many other variations on the scanning perturbation techniques useful in diverse application, described will be apparent to those practicing the art. For example, the scanning electron beam of an image orthicon camera or video camera may be perturbed by adding appropriate signals to the normal horizontal and vertical deflecting coils.

V. Color Image Resolution Enhancement

Although the previous discussion did not explicitly discuss full color facsimile or video images, it would be apparent to those practicing the art that the same principles maybe extended to improving the resolution of multicolor raster scan images. Color reproduction implies generating two or more (typically three) raster scan images for each full color image, one complementary color rendition for each of the colors selected to synthesize the full color range. By superimposing the multiple complementary color raster scan images, a full color approximation to the original color image is produced. Separation of the color image into two or more complementary single color raster scan images may be accomplished by optically filtering and separating a single image scan into the two or three complementary single color raster scans simultaneously.

If the tracking deviations, random or otherwise, are introduced in the scanner prior to the optical color filtering, each single complementary color raster scan would incorporate the same tracking errors. Hence, alignment of the prototype with any of the other scans may be done comparing one of the complementary color raster images. The alignment adjustments may then be used for all two or three color raster scans representing each full color image.

Having adjusted for the tracking error alignment errors for each color separated image set, each of the separate pixel color intensities maybe adjusted in accordance with the monochrome method previously described. A final, improved resolution full color image, is then created by combining the two or three complementary color raster scans of the prototype.

IV Character Regeneration

An additional application for the high resolution image restoration described is in the field of character reconstruction in which low resolution images of a given character are used to construct higher resolution renditions of the given character and then an entire page of characters can be regenerated using an alphabet of higher resolution characters.

The basic technique used in character regeneration is the same as previously described except that the image reconstruction is selectively limited to one character at a time. For example, a page of associated characters may be scanned and then all scanned character images are sorted by character type and assigned to a character exemplar set. The assignment operation may be done visually or automatically by use of any one of many well known character recognition schemes. For example, see Simard et al., "Efficient Pattern Recognition Using a New Transformation Distance", NIPS-5 (Neural Information Processing Systems 5), ed. Hanson et al., 1993 pp. 50–58.

The character exemplars, each represented by an extracted portion of a raster scan, are treated as complete low resolution raster scans. A high resolution image of a given character is then generated by the same techniques previously described, i.e. selecting a prototype from the character exemplar set, interpolating the prototype, aligning the prototype with one of the remaining exemplars, adjusting the prototype mixel intensities, and repeating the alignment and mixel adjustment with each of the remaining exemplars. As previously discussed, the alignment and mixel intensity operation may be repeated as desired. The result is a reconstructed image of a given character. After all of the required class of characters have been reconstructed (using as many original pages as necessary), entire pages may be "printed" using the reconstructed character set. The reconstruction process is context independent because the text may consist of any font, of any alphabet, and of any collection of linguistic, mathematical or other symbols. The process only requires that sufficient samples be available to realize a sufficiently improved character reconstruction.

Thus, in the context of a system, the same apparatus and methods used for enhancing image resolution may be used for the character regeneration application.

VII. Image Enhancement System

FIG. 12 is a block diagram of a completely self-contained image resolution enhancement system comprising: a scanner 301 for scanning an input image and producing a set of raster scanned images at its output that are applied to analog-to-digital converter (ADC) 309 for pixel sampling and quantization. The binary encoded output of ADC 309 is buffered, as required, in buffer storage 302 before being stored in main image memory 303 which is accessible to output buffer 305, CPU controller 307, and arithmetic processor 304. Arithmetic processor 304 performs, under CPU 307 control, the image signal processing operations including: prototype selection, prototype interpolation, image alignment, mixel adjustments, and storing results in memory 303. Output buffer 305 accepts processed and resolution enhanced raster scans for temporarily storing and supplying digital-to-analog converter 310 with the requisite binary coded signals to drive output recorder 306 that produces a raster scan reconstruction of the improved resolution image. CPU controller 307 performs overall system control. Jitter and cogging control unit 308 optionally provides auxiliary input signals and controls to scanner 301 for applying known offset "errors" into the raster scan of scanner 301. This same information is made available by CPU 307 to arithmetic process 304. In this configuration, the system of FIG. 12 is a self-contained copying unit using a lower resolution scanner 301 to produce a higher resolution output copy of the input image. This system configuration is suitable for use as a high resolution image copier or as a character regeneration system. In the latter case, the output raster scan would be based on regenerated characters and produced under CPU 307 control.

However, the system of FIG. 12 may be reconfigured so that the image scanning and output recording function are separated by a communication link. FIG. 13 shows scanner/ transmitter unit 320, image processor/controller unit 340, and recording receiver 330 as defined in FIG. 12. In one configuration scanner transmitter 320 in separated from units 340 and 330 by communication link 321 as indicated by the dotted-line sectioning line A—A. Optional control 325 provides the necessary local control functions required by scanner/transmitter 320.

In another embodiment, the system may be sectioned along dotted line B—B so that the image processor/controller unit 340 is at the image source end together with scanner/transmitter unit 320 and data link 331 provides the communication path to the decoder/receiver 330 operating in conjunction with a local controller 335.

VIII. Image Enhancement Examples

In this latter configuration, the system transmits a single high resolution image over communication link 331 while in the former configuration, multiple images are transmitted of data link 321.

FIG. 14 is an example of a resolution enhanced image produced by the method described. The upper left portion shows six original scans. The upper right is an interpolated prototype. The lower left is the mixel image after one iteration of enhancement. The lower right image is the enhanced image after serial enhancement iterations.

FIG. 15 is an example of the reconstruction of the letter "a". The upper left portion shows a 10×10 array of different scanned letter "a" examples collected from the same image. The upper right shows the interpolated prototype. The lower left is the image after one iteration. The lower right shows the letter "a" after two passes through 100 exemplars and after thresholding. Thresholding has been applied in order to suppress low intensity portions of the reconstructed character and improved the image contrast.

Figure 18A:
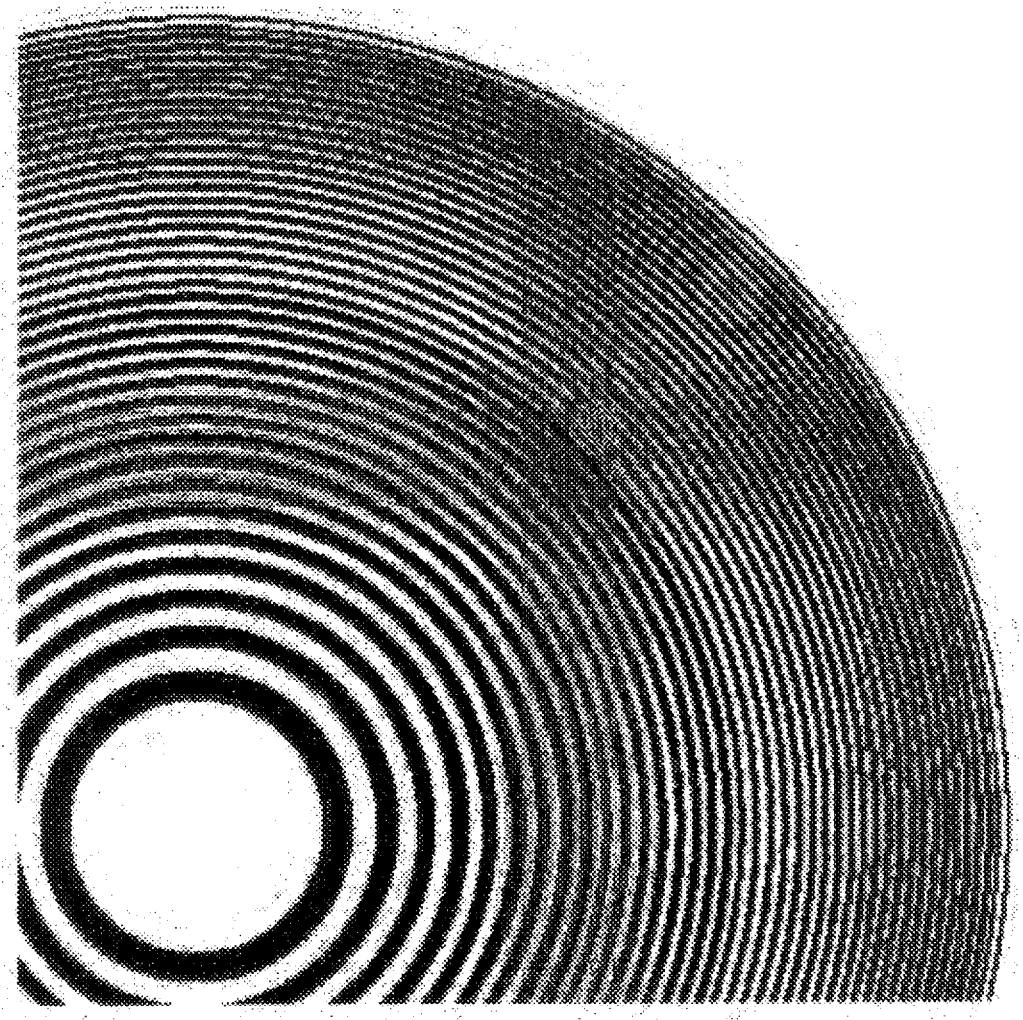
FIG. 18 shows the MC enhanced image and the GD enhanced image in (a) and (b) respectively.
Figure 18B:
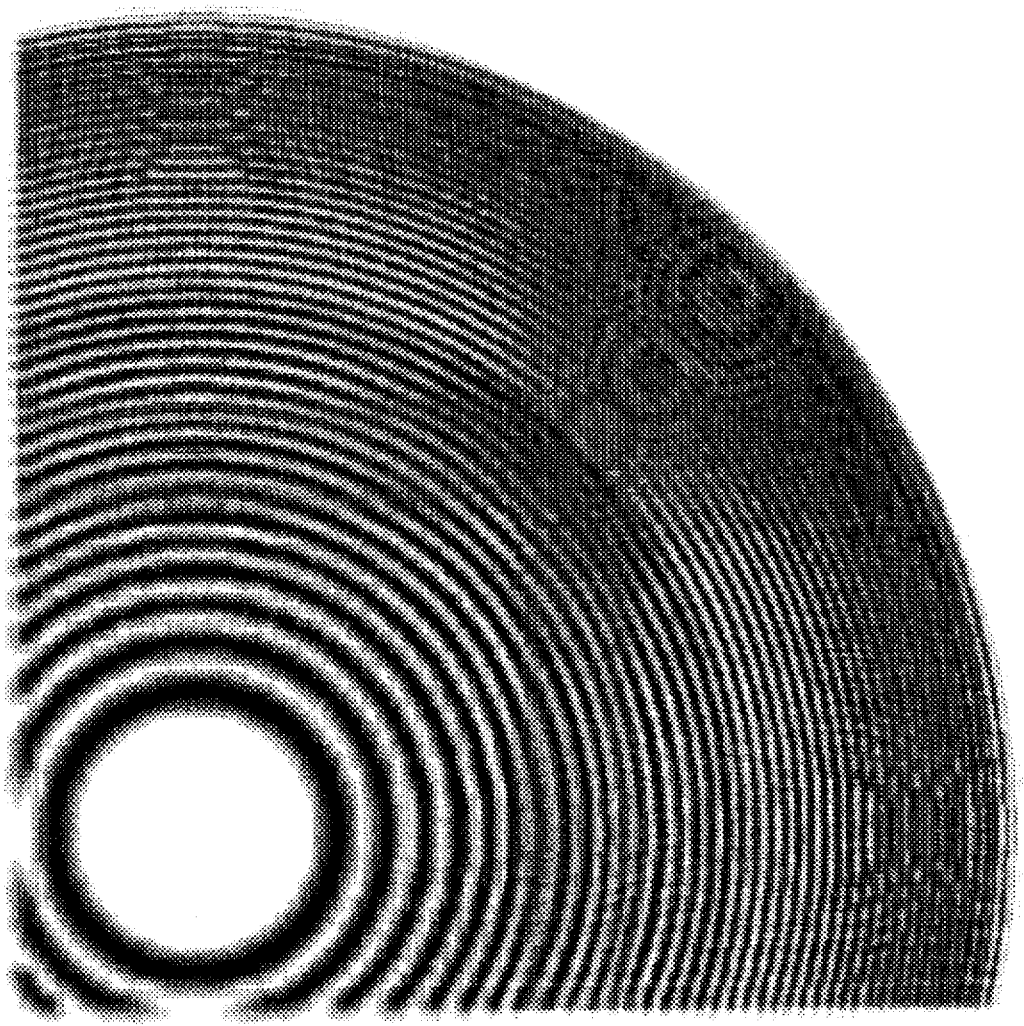

FIG. 16 shows an image of a 480×480 element Fresnel pattern. FIG. 17 is an example of FIG. 16 after scanning using 91×91 pixels. FIG. 18(a) shows a reconstructed pattern using the MC method while FIG. 18(b) shows the reconstructed pattern using the gradient descent method. In both cases the reconstruction is over a spread image of 480×480 mixes using 25 raster scans. The MC method used a cluster of 3×3=9 mixels. The MC method used in FIG. 18(a) produces a clearly superior image to that of FIG. 18(b).

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system for producing an enhanced resolution image from a set of lower resolution raster scanned images of an original image, the system comprising:

(a) a scanner with a point-spread-function (PSF) represented by a two-dimensional set of known values for raster scanning the original image subject and for producing as an output a multiplicity of signals, one for each raster scanned representation of the original image and having means for introducing tracking errors to ensure adequate variety in each raster scan of the original image for efficient reconstruction of an enhanced resolution raster scan image;

(b) converter means for uniformly sampling and quantizing the scanner output signal for producing a multiplicity of pixel value sets, one pixel value set for each scanner output signal;

(c) a memory for temporary storage of the multiplicity of pixel value sets produced by the converter means; and (d) a numerical processor coupled to the memory for access to the stored pixel value sets, for storing of processed pixel value sets, and for executing a stored image resolution enhancement program, the numerical processor including means for, (i) selecting one of the multiplicity of pixel value sets as a prototype scan from memory, the non-selected pixel value sets referred to as remaining pixel scans, (ii) interpolating the prototype scan pixel values to produce an interpolated prototype scan with a higher density of sampled and quantized pixel values, the higher density of pixel values referred to as mixels, (iii) aligning the interpolated prototype scan with a selected pixel scan of the remaining pixel scans, (iv) adjusting the aligned interpolated prototype scan mixel values by minimizing an error cost function representative of a difference measure between a selected pixel of the selected pixel scan and a pixel value computed from the mixel values of the interpolated prototype scan using the scanner means known PSF to produce a computed pixel value from the interpolated prototype scan mixel values, for producing a modified prototype scan, and (v) repeating the use of the means for aligning the interpolated prototype scan and the means for adjusting the aligned prototype scan for each of the non-selected remaining pixel scans using the modified prototype scan as the interpolated prototype scan so that after all remaining pixel scans are processed, the modified prototype scan is an enhanced resolution raster scan image of the original image.

2. The system of claim 1 further comprising a recorder means for accepting from the memory the enhanced resolution prototype scan and producing therefrom an enhanced resolution image.

3. The system of claim 1 wherein the tracking errors are of a known form.

4. The system of claim 3 wherein the numerical processor further comprises means for removing the tracking errors of known form from each of the multiplicity of pixel value sets.

5. The system of claim 1 wherein the means for adjusting the aligned interpolated prototype scan mixel values minimizes the error cost function by an iterative gradient descent algorithm.

6. The system of claim 1 wherein the means for aligning the interpolated prototype scan with a selected pixel scan is performed by minimizing a distance metric representative of the difference between the selected pixel scan and corresponding mixel values of the interpolated prototype scan.

7. The system of claim 6 wherein the distance metric is a quadratic distance metric.

8. The system of claim 6 wherein the distance metric is based on the absolute difference between the selected pixel scan and corresponding mixel values of the interpolated prototype scan.

9. The system of claim 6 wherein the means for aligning the prototype scan with a selected pixel scan is performed by maximizing a two-dimensional cross-covariance function.

10. A system for producing an enhanced resolution image from a set of lower resolution raster scanned images of an original image, the system comprising:

(a) a scanner with a point-spread-function (PSF) represented by a set of known values for raster scanning the original image subject and for producing as an output a multiplicity of signals, one for each raster scanned representation of the original image and having means for introducing tracking errors to ensure adequate variety in each raster scan of the original image for efficient reconstruction of an enhanced resolution raster scan image;

(b) converter means for uniformly sampling and quantizing the scanner output signal for producing a multiplicity of pixel value sets, one pixel value set for each scanner output signal;

(c) a memory for temporary storage of the multiplicity of pixel value sets produced by the converter means; and (d) a numerical processor coupled to the memory for access to the stored pixel value sets, for storing of processed pixel value sets, and for executing a stored image resolution enhancement program, the numerical processor including means for, (i) selecting one of the multiplicity of pixel value sets as a prototype scan from memory, the non-selected pixel value sets referred to as remaining pixel scans, (ii) interpolating the prototype scan pixel values to produce an interpolated prototype scan with a higher density of sampled and quantized pixel values, the higher density of pixel values referred to as mixels, (iii) aligning the interpolated prototype scan with a selected pixel scan of the remaining pixel scans, (iv) adjusting the aligned interpolated prototype scan mixel values by minimizing an error cost function representative of a difference measure between a selected pixel of the selected pixel scan and a pixel value computed from the mixel values of the interpolated prototype scan using the scanner means known PSF to produce a computed pixel value from the interpolated prototype scan mixel values, for producing a modified prototype scan, the means for adjusting the aligned interpolated prototype scan mixel values including means for (aa) forming overlapping cluster zones from contiguous prototype mixel elements contained within a rectangular array, (bb) forming an associated mixel zone vector, one vector associated with each overlapping cluster zone, having elements corresponding to the prototype scan mixel values included within the associated overlapping cluster zone, (cc) forming a zone matrix, each row having elements representative of known PSF values, which when multiplied by the associated mixel zone vector produces a vector of pixel value representative of the pixel elements included within the associated overlapping cluster zone, and (dd) sequentially solving for each associated mixel zone vector using any overlapping elements of the associated mixel zone vector, as obtained, for updating the prototype scan mixel values, and (v) repeating the use of the means for aligning the interpolated prototype scan and the means for adjusting the aligned prototype scan for each of the non-selected remaining pixel scans using the modified prototype scan as the interpolated prototype scan so that after all remaining pixel scans are processed, the modified prototype scan is an enhanced resolution raster scan image of the original image.

11. The system of claim 10 further comprising a recorder means for accepting from the memory the enhanced resolution prototype scan and producing therefrom an enhanced resolution image.

12. An image enhancement processor for use with a facsimile point-of-origin image scanner for producing a signal representative of an enhanced resolution image, the image enhancement processor connected to the output of the facsimile point-of-origin image scanner, the image scanner output represented by a multiplicity of sampled and quantized raster scans, each sampled and quantized raster scans forming a set of pixel values, the image enhancement processor comprising:

(a) a memory for temporary storage of the multiplicity of pixel value sets; and (b) a numerical processor coupled to the memory for access to the stored pixel value sets, for storing of processed pixel value sets, and for executing a stored image resolution enhancement program the numerical processor including means for, (i) selecting one of the multiplicity of pixel value sets as a prototype scan from memory, the non-selected pixel value sets referred to as remaining pixel scans, (ii) interpolating the prototype scan pixel values to produce an interpolated prototype scan with a higher density of sampled and quantized pixel values, the higher density of pixel values referred to as mixels, (iii) aligning the interpolated prototype scan with a selected pixel scan of the remaining pixel scans, (iv) adjusting the aligned interpolated prototype scan mixel values by minimizing an error cost function representative of a difference measure between a selected pixel of the selected pixel scan and a pixel value computed from the mixel values of the interpolated prototype scan using the scanner means PSF to produce a computed pixel value from the interpolated prototype scan mixel values, for producing a modified prototype scan, and the means for adjusting the aligned interpolated prototype scan mixel values including means for (aa) forming overlapping cluster zones from contiguous prototype mixel elements contained within a rectangular array;

(bb) forming an associated mixel zone vector, one vector associated with each overlapping cluster zone, having elements corresponding to the prototype scan mixel values included within the associated overlapping cluster zone, (cc) forming a zone matrix, each row having elements representative of known PSF values, which when multiplied by the associated mixel zone vector produces a vector of pixel value representative of the pixel elements included within the associated overlapping cluster zone, and (dd) sequentially solving for each associated mixel zone vector using any overlapping elements of the associated mixel zone vector, as obtained, for updating the prototype scan mixel values; and (v) repeating the use of the means for aligning the interpolated prototype scan and the means for adjusting the aligned prototype scan for each of the non-selected remaining pixel scans using the modified prototype scan as the interpolated prototype scan so that after all remaining pixel scans are processed, the modified prototype scan is an enhanced resolution raster scan image of the original image.

13. An image enhancement point-of-origin facsimile scanner system for producing an enhanced resolution image for transmission, the system comprising:

(a) a scanner with a known point-spread-function (PSF) for raster scanning the original image subject and for producing as an output a multiplicity of signals, one for each raster scanned representation of the original image;

(b) converter means for uniformly sampling and quantizing the scanner output signal for producing a multiplicity of pixel value sets, one pixel value set for each scanner output signal;

(c) a memory for temporary storage of the multiplicity of pixel value sets produced by the converter means; and (d) a numerical processor coupled to the memory for access to the stored pixel value sets, for storing of processed pixel values, and for executing a stored image resolution enhancement program the numerical processor including means for, (i) selecting one of the multiplicity of pixel value sets as a prototype scan from memory, the non-selected pixel value sets referred to as remaining pixel scans, (ii) interpolating the prototype scan pixel values to produce an interpolated prototype scan with a higher density of sampled and quantized pixel values, the higher density of pixel values referred to as mixels, (iii) aligning the interpolated prototype scan with a selected pixel scan of the remaining pixel scans, (iv) adjusting the aligned interpolated prototype scan mixel values by minimizing an error cost function representative of a difference measure between a selected pixel of the selected pixel scan and a pixel value computed from the mixel values of the interpolated prototype scan using the scanner means PSF to produce a computed pixel value from the interpolated prototype scan mixel values, for producing a modified prototype scan, and the means for adjusting the aligned interpolated prototype scan mixel values including means for (aa) forming overlapping cluster zones from contiguous prototype mixel elements contained within a rectangular array;

(bb) forming an associated mixel zone vector, one vector associated with each overlapping cluster zone, having elements corresponding to the prototype scan mixel values included within the associated overlapping cluster zone, (cc) forming a zone matrix, each row having elements representative of known PSF values, which when multiplied by the associated mixel zone vector produces a vector of pixel value representative of the pixel elements included within the associated overlapping cluster zone, and (dd) sequentially solving for each associated mixel zone vector using any overlapping elements of the associated mixel zone vector, as obtained, for updating the prototype scan mixel values; and (v) repeating the use of the means for aligning the interpolated prototype scan and the means for adjusting the aligned prototype scan for each of the non-selected remaining pixel scans using the modified prototype scan as the interpolated prototype scan so that after all remaining pixel scans are processed, the modified prototype scan is an enhanced resolution raster scan image of the original image.

14. The system of claim 13 further comprising means for perturbing the scanner by introducing offset errors in order to ensure adequate variety in each raster scan representation of the original image for efficient reconstruction of an enhanced resolution scan image using a minimum number of raster scans for a given level of enhancement.

15. The system of claim 14 wherein the offset errors are of a known form.

16. The system of claim 15 wherein the numerical processor further comprises means for removing the offset errors of a known form from each of the multiplicity of pixel value sets.

17. The system of claim 13 wherein the means for adjusting the aligned interpolated prototype scan mixel values minimizes the error cost function by an iterative gradient descent algorithm.

18. The system of claim 13 wherein the means for aligning the interpolated prototype scan with a selected pixel scan is performed by minimizing a distance metric representative of the difference between the selected pixel scan and corresponding mixel values of the interpolated prototype scan.

19. The system of claim 18 wherein the distance metric is a quadratic distance metric.

20. The system of claim 18 wherein the distance metric is based on the absolute difference between the selected pixel scan and corresponding mixel values of the interpolated prototype scan.

21. The system of claim 18 wherein the means for aligning the prototype scan with a selected pixel scan is performed by maximizing a two-dimensional cross-covariance function.

22. An image enhancement processor system for use with a destination facsimile receiver for producing an enhanced resolution image from a multiplicity of received lower resolution sampled and quantized raster scanned images, each sampled and quantized raster scan image represented by a pixel value set, the image enhancement processor system comprising:

(a) a memory for temporary storage of the multiplicity of pixel value sets; and (b) a numerical processor coupled to the memory for access to the stored sets of pixel value sets, for storing of processed pixel values, and for executing a stored image resolution enhancement program the numerical processor including means for, (i) selecting one of the multiplicity of pixel value sets as a prototype scan from memory, the non-selected pixel value sets referred to as remaining pixel scans, (ii) interpolating the prototype scan pixel values to produce an interpolated prototype scan with a higher density of sampled and quantized pixel values, the higher density of pixel values referred to as mixels, (iii) aligning the interpolated prototype scan with a selected pixel scan of the remaining pixel scans, (iv) adjusting the aligned interpolated prototype scan mixel values by minimizing an error cost function representative of a difference measure between a selected pixel of the selected pixel scan and a pixel value computed from the mixel values of the interpolated prototype scan using the scanner means PSF to produce a computed pixel value from the interpolated prototype scan mixel values, for producing a modified prototype scan, and the means for adjusting the aligned interpolated prototype scan mixel values including means for (aa) forming overlapping cluster zones from contiguous prototype mixel elements contained within a rectangular array;

(bb) forming an associated mixel zone vector, one vector associated with each overlapping cluster zone, having elements corresponding to the prototype scan mixel values included within the associated overlapping cluster zone, (cc) forming a zone matrix, each row having elements representative of known PSF values, which when multiplied by the associated mixel zone vector produces a vector of pixel value representative of the pixel elements included within the associated overlapping cluster zone, and (dd) sequentially solving for each associated mixel zone vector using any overlapping elements of the associated mixel zone vector, as obtained, for updating the prototype scan mixel values; and (v) repeating the use of the means for aligning the interpolated prototype scan and the means for adjusting the aligned prototype scan for each of the non-selected remaining pixel scans using the modified prototype scan as the interpolated prototype scan so that after all remaining pixel scans are processed, the modified prototype scan is an enhanced resolution raster scan image of the original image.

23. The image enhancement processor system of claim 22 wherein the means for adjusting the aligned integrated prototype scan mixel values minimizes the error cost function by an iterative gradient descent algorithm.

24. The image enhancement processor system of claim 22 wherein the means for aligning the interpolated prototype scan with a selected pixel scan in performed by minimizing a distance metric representative of the difference between the selected pixel scan and corresponding mixel values of the interpolated prototype scan.

25. The image enhancement processor system of claim 22 wherein the means for aligning the prototype scan with a selected pixel scan is performed by maximizing a two-dimensional cross-covariance function.

26. A method for producing an enhanced resolution image from a multiplicity of lower resolution raster scan images produced by a scanner with known point-spread-function (PSF), each represented by a set of uniformly sampled and quantized pixel values, the method comprising the following steps:

(a) storing the multiplicity of lower resolution raster scan images;

(b) selecting one of the multiplicity of pixel value sets as a prototype scan from memory, the non-selected pixel value sets referred to as remaining pixel scans, (c) interpolating the prototype scan pixel values to produce an interpolated prototype scan with a higher density of sampled and quantized pixel values, the higher density of pixel values referred to as mixels, (d) aligning the interpolated prototype scan with a selected pixel scan of the remaining pixel scans, (e) adjusting the aligned interpolated prototype scan mixel values by minimizing an error cost function representative of a difference measure between a selected pixel of the selected pixel scan and a pixel value computed from the mixel values of the interpolated prototype scan using the scanner means PSF to produce a computed pixel value from the interpolated prototype scan mixel values, for producing a modified prototype scan, the steps of adjusting the aligned interpolated prototype scan mixel values including (i) forming overlapping cluster zones from contiguous prototype mixel elements contained within a rectangular array, (ii) forming an associated mixel zone vector, one vector associated with each overlapping cluster zone, having elements corresponding to the prototype scan mixel values included within the associated overlapping cluster zone, (iii) forming a zone matrix, each row having elements representative of known PSF values, which when multiplied by the associated mixel zone vector produces a vector of pixel values representative of the pixel elements included within the associated overlapping cluster zone, and (iv) sequentially solving for each associated mixel zone vector using any overlapping elements of the associated mixel zone vector, as obtained, for updating the prototype scan mixel values; and (f) repeating the use of the step for aligning the interpolated prototype scan and the step for adjusting the aligned prototype scan for each of the non-selected remaining pixel scans using the modified prototype scan as the interpolated prototype scan so that after all remaining pixel scans are processed, the modified prototype scan is an enhanced resolution raster scan image of the original image.

27. The method of claim 26 wherein the known point-spread-function (PSF) is estimated from any known physical characteristics of the scanner.

28. The method of claim 26 further comprising: scanning an original image more than once with a scanner having a known point-spread-function (PSF); and perturbing the scanner with offset errors of known form.

29. The method of claim 28 further comprising the step of removing any known offset errors from the multiplicity of stored lower resolution raster scan images.

30. The method of claim 29 wherein the step of adjusting the aligned interpolated prototype scan mixel values minimizes the error cost function by use of an iterative gradient descent algorithm.

31. The method of claim 28 wherein the step of perturbing the scanner with offset errors are fixed horizontal and vertical displacements, respectively, that differ for each raster scan.

32. The method of claim 26 wherein the step for aligning the interpolated prototype scan with a selected pixel scan is performed by minimizing a distance metric representative of the difference between the selected pixel scan and corresponding mixel values of the interpolated prototype scan.

33. The method of claim 26 wherein the step for aligning the prototype scan with a selected pixel scan is performed by maximizing a two-dimensional cross-covariance function.

34. A method for reconstructing often used characters from raster scanned documents containing multiple examples of the often used characters, the method comprising the following steps:

(a) raster scanning at least one document containing multiple examples of each character to be reconstructed using a scanner with known point-spread-function (PSF) and producing a uniformly sampled and quantized pixel raster scan;

(b) storing each scanned pixel raster scan;

(c) selecting a set of scanned exemplars of a given character from one or more pixel raster scan;

(d) selecting one of the set of scanned exemplars as a prototype of the given character;

(e) interpolating the prototype of a given character to produce a high resolution mixel image of the prototype;

(f) aligning the interpolated prototype with a remaining scanned example of selected set of scanned exemplars of the given character;

(g) adjusting the aligned interpolated prototype mixel values by computing a pixel value using the known PSF as a convolution kernel and comparing the computed pixel value with the corresponding pixel value of the scanned example of the given character for producing an updated prototype character with improved resolution;

(h) repeating steps (f) and (g) for all secured examples selected in step (c); and (i) using the updated prototype character, after all scanned exemplars selected in step (c) are processed in steps (f) and (g) as the reconstructed given character.

35. The method of claim 34 wherein the known PSF is estimated from any known physical characteristics of the scanner.

36. The method of claim 34 further comprising thresholding of the reconstructed given character for producing a sharpened character image.

37. The method of claim 34 wherein the step of raster scanning further comprises introducing tracking errors to ensure adequate variety in each raster scan of the original image for efficient reconstruction of an enhanced resolution raster scan image.

38. The method of claim 34 wherein the step of adjusting the aligned interpolated prototype mixel values uses an iterative gradient descent algorithm.

39. The method of claim 34 wherein the step of adjusting the aligned interpolated prototype mixel values comprises adjusting the aligned interpolated prototype scan mixel values by minimizing an error cost function representative of a difference measure between a selected pixel of the selected pixel scan and a pixel value computed from the mixel values of the interpolated prototype scan using the scanner PSF to produce a computed pixel value from the interpolated prototype scan mixel values, for producing a modified prototype scan, the steps of adjusting the aligned interpolated prototype scan mixel values including:

(a) forming overlapping cluster zones from contiguous prototype mixel elements contained within a rectangular array;

(b) forming an associated mixel zone vector, one vector associated with each overlapping cluster zone, having elements corresponding to the prototype scan mixel values included within the associated overlapping cluster zone;

(c) forming a zone matrix, each row having elements representative of known PSF values, which when multiplied by the associated mixel zone vector produces a vector of pixel values representative of the pixel elements included within the associated overlapping cluster zone; and (d) sequentially solving for each associated mixel zone vector using any overlapping elements of the associated mixel zone vector, as obtained, for updating the prototype scan mixel values.

* * * * *